United States Patent
Takarada et al.

(10) Patent No.: US 9,688,008 B2
(45) Date of Patent: *Jun. 27, 2017

(54) MANUFACTURING METHOD FOR CARTRIDGE HAVING A MOLDED ELECTRODE

(71) Applicant: CANON KABUSHIKI KAISHA, Tokyo (JP)

(72) Inventors: Hiroshi Takarada, Tokyo (JP); Kuniaki Hirukawa, Susono (JP); Akira Suzuki, Naka-gun (JP); Nobuharu Hoshi, Yokohama (JP); Yuichi Fukui, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,029

(22) Filed: May 12, 2016

(65) Prior Publication Data

US 2016/0257041 A1   Sep. 8, 2016

Related U.S. Application Data

(60) Division of application No. 14/520,784, filed on Oct. 22, 2014, now Pat. No. 9,367,025, which is a division
(Continued)

(30) Foreign Application Priority Data

Aug. 20, 2010   (JP) .................................. 2010-185147
Jul. 21, 2011    (JP) .................................. 2011-160155

(51) Int. Cl.
    *G03G 21/16*    (2006.01)
    *B29C 45/00*    (2006.01)
    (Continued)

(52) U.S. Cl.
    CPC ..... *B29C 45/0001* (2013.01); *G03G 21/1619* (2013.01); *G03G 21/1652* (2013.01);
    (Continued)

(58) Field of Classification Search
    CPC .................................................. G03G 21/1867
    (Continued)

(56) References Cited

U.S. PATENT DOCUMENTS

| 5,485,249 A | 1/1996 | Higeta et al. |
| 5,740,499 A | 4/1998 | Higeta et al. |

(Continued)

FOREIGN PATENT DOCUMENTS

| CN | 1277913 | 12/2000 |
| JP | 5-249782 | 9/1993 |

(Continued)

OTHER PUBLICATIONS

Translation of Hamuro et al. (JP Pub.2008-292556) provided to applicants' benefit.*

(Continued)

*Primary Examiner* — David Gray
*Assistant Examiner* — Laura Roth
(74) *Attorney, Agent, or Firm* — Fitzpatrick, Cella, Harper & Scinto

(57) ABSTRACT

A manufacturing method of a cartridge that is detachably mountable to an apparatus main assembly of an image forming apparatus. The manufacturing method includes a step of integrally molding a cartridge electrode with a frame in a manner such that a mold is contacted to the frame to form a space including a first portion for forming a first contact portion, a second portion for forming a second contact portion, and a connecting portion branching from an
(Continued)

injection portion into the first portion and the second portion, and electroconductive resin is injected into the space.

10 Claims, 30 Drawing Sheets

Related U.S. Application Data of application No. 13/556,653, filed on Jul. 24, 2012, now Pat. No. 8,879,944, which is a continuation of application No. PCT/JP2011/069237, filed on Aug. 19, 2011.

(51) Int. Cl.
| | |
|---|---|
| *G03G 21/18* | (2006.01) |
| *B29K 59/00* | (2006.01) |
| *B29K 105/16* | (2006.01) |
| *B29K 507/04* | (2006.01) |
| *B29L 31/00* | (2006.01) |
| *G03G 15/08* | (2006.01) |

(52) U.S. Cl.
CPC ...... *G03G 21/1867* (2013.01); *B29K 2059/00* (2013.01); *B29K 2105/16* (2013.01); *B29K 2507/04* (2013.01); *B29K 2995/0005* (2013.01); *B29L 2031/7678* (2013.01); *G03G 15/0865* (2013.01)

(58) Field of Classification Search
USPC ............ 399/88–90, 110, 111; 264/272.15, 264/272.16, 272.17
See application file for complete search history.

(56) References Cited

U.S. PATENT DOCUMENTS

| | | | |
|---|---|---|---|
| 5,809,374 A | 9/1998 | Tsuda et al. |
| 5,966,567 A | 10/1999 | Matsuzaki et al. |
| 6,078,763 A | 6/2000 | Hoshi |
| 6,144,815 A | 11/2000 | Chadani et al. |
| 6,154,623 A | 11/2000 | Suzuki et al. |
| 6,173,140 B1 | 1/2001 | Suzuki et al. |
| 6,173,145 B1 | 1/2001 | Chadani et al. |
| 6,205,305 B1 | 3/2001 | Suzuki et al. |
| 6,219,504 B1 | 4/2001 | Matsuzaki et al. |
| 6,246,853 B1 | 6/2001 | Suzuki et al. |
| 6,282,389 B1 | 8/2001 | Matsuzaki et al. |
| 6,336,012 B1 | 1/2002 | Noda et al. |
| 6,415,121 B1 | 7/2002 | Suzuki et al. |
| 6,442,359 B1 | 8/2002 | Numagami et al. |
| 6,463,233 B2 | 10/2002 | Kojima et al. |
| 6,512,895 B2 | 1/2003 | Sakurai et al. |
| 6,549,736 B2 | 4/2003 | Miyabe et al. |
| 6,577,831 B1 | 6/2003 | Kojima et al. |
| 6,654,578 B2 | 11/2003 | Suzuki et al. |
| 6,771,920 B2 | 8/2004 | Abe et al. |
| 6,795,666 B2 | 9/2004 | Miyabe et al. |
| 6,804,475 B2 | 10/2004 | Oguma et al. |
| 6,823,153 B2 | 11/2004 | Ueno et al. |
| 6,865,357 B2 | 3/2005 | Fujita et al. |
| 6,868,243 B2 | 3/2005 | Watanabe et al. |
| 6,873,815 B2 | 3/2005 | Matsuda et al. |
| 6,931,226 B2 | 8/2005 | Chadani et al. |
| 6,934,485 B2 | 8/2005 | Miyabe et al. |
| 6,990,302 B2 | 1/2006 | Toba et al. |
| 7,027,756 B2 | 4/2006 | Hoshi et al. |
| 7,072,594 B2 | 7/2006 | Hoshi et al. |
| 7,099,607 B2 | 8/2006 | Suzuki et al. |
| 7,127,194 B2 | 10/2006 | Hoshi et al. |
| 7,162,174 B2 | 1/2007 | Suzuki et al. |
| 7,162,181 B2 | 1/2007 | Maeshima et al. |
| 7,346,293 B2 | 3/2008 | Suzuki et al. |
| 7,349,649 B2 | 3/2008 | Hoshi et al. |
| 7,366,439 B2 | 4/2008 | Anan et al. |
| 7,912,404 B2 | 3/2011 | Hoshi et al. |
| 7,933,534 B2 | 4/2011 | Hoshi et al. |
| 8,155,553 B2 | 4/2012 | Takarada |
| 8,249,485 B2 | 8/2012 | Horikawa et al. |
| 8,879,944 B2 * | 11/2014 | Takarada ............ G03G 21/1867 399/111 |
| 2001/0026701 A1 | 10/2001 | Sasaki et al. |
| 2002/0191981 A1 | 12/2002 | Miyabe et al. |
| 2009/0245851 A1 | 10/2009 | Hoshi et al. |
| 2009/0290904 A1 | 11/2009 | Kawai et al. |
| 2011/0058846 A1 | 3/2011 | Hirukawa et al. |
| 2011/0170903 A1 | 7/2011 | Hoshi et al. |
| 2011/0217075 A1 | 9/2011 | Uehara et al. |

FOREIGN PATENT DOCUMENTS

| | | |
|---|---|---|
| JP | 6-025854 | 2/1994 |
| JP | 09-015967 | 1/1997 |
| JP | 11-342522 | 12/1999 |
| JP | 2001-085600 | 3/2001 |
| JP | 2001-110203 | 4/2001 |
| JP | 2004-172032 | 6/2004 |
| JP | 2005-038957 | 2/2005 |
| JP | 2006-044025 | 2/2006 |
| JP | 2007047491 | 2/2007 |
| JP | 2008-292556 | 12/2008 |
| JP | 2008-292557 | 12/2008 |

OTHER PUBLICATIONS

Notice of Allowance in Russian Patent Application No. 2013112315/28(018270), mailed May 27, 2014 (with English translation).

Office Action in Chinese Patent Application No. 201180039272.7, dated Dec. 2, 2014 (with English translation).

Search Report in European Patent Application No. 11818273.2, dated Sep. 28, 2015.

* cited by examiner (a)

(b)

(a)

(b)

(a)

(b)

(a)

(b)

(c)

(a)

(b)

(a)

(b)

(a)

(b)

(a)

(b)

MANUFACTURING METHOD FOR CARTRIDGE HAVING A MOLDED ELECTRODE

TECHNICAL FIELD

The present invention relates to an image forming apparatus and a cartridge detachably mountable to an apparatus main assembly of the image forming apparatus.

BACKGROUND ART

Heretofore, in the image forming apparatus, a cartridge type in which process means are integrally formed in a cartridge and the cartridge is detachably mountable to the image forming apparatus main assembly has been employed. In such a cartridge type, in a state in which the cartridge is mounted in the image forming apparatus main assembly, a main assembly electrode of the image forming apparatus main assembly and an electrode member of the cartridge are contacted, so that conduction receiving members such as the process means and the like are electrically connected to the image forming apparatus main assembly.

Here, as an example of the electrode member, a constitution in which a metal electrode plate is assembled with a frame constituting a cartridge is described in Japanese Laid-Open Patent Application 2007-47491.

However, in the above-described conventional example, there was a need to provide an opening for mounting the electrode plate on the frame and a structure for positioning to each of the frame and the electrode plate. For that reason, the structures of the frame and the electrode plate were complicated. Further, a step for mounting the electrode plate to the frame was generated and at that time, there was a need to treat the electrode plate so as not to cause deformation or the like.

DISCLOSURE OF THE INVENTION

In an embodiment of the present invention, there is provided a cartridge detachably mountable to an apparatus main assembly of an image forming apparatus, comprising:
 (a) process means for effecting image formation;
 (b) a frame for supporting the process means; and
 (c) a cartridge electrode integrally molded by injecting an electroconductive resin into the frame,
 wherein the cartridge electrode comprises:
 a first contact portion, exposed toward an outside of the frame, contacted to a main assembly contact provided in the apparatus main assembly when the cartridge is mounted in the apparatus main assembly;
 a second contact portion provided for being electrically connected to the process means; and
 an injection receiving portion into which the resin is injected when the cartridge electrode is molded into the frame, and
 wherein the electroconductive resin injected from the injection receiving portion is branched to mold the first contact portion and the second contact portion so that an electroconductive path for electrically connecting the main assembly contact and the process means is formed.

BEST MODE FOR CARRYING OUT THE INVENTION

Hereinbelow, embodiments of the present invention will be exemplarily and specifically described with reference to the drawings. However, dimensions, materials, shapes, relative arrangements and the like of constituent elements described in the following embodiments should be appropriately changed depending on constitutions or various conditions of apparatuses to which the present invention is applied, and therefore, the scope of the present invention is not limited to the following embodiments.

[Embodiment 1]

Hereinbelow, examples of an electrophotographic image forming apparatus according to this embodiment, a process cartridge, a drum unit and a molding method of an electrode portion will be described with reference to figures.

[General Arrangement of Electrophotographic Image Forming Apparatus]

Figure 2:
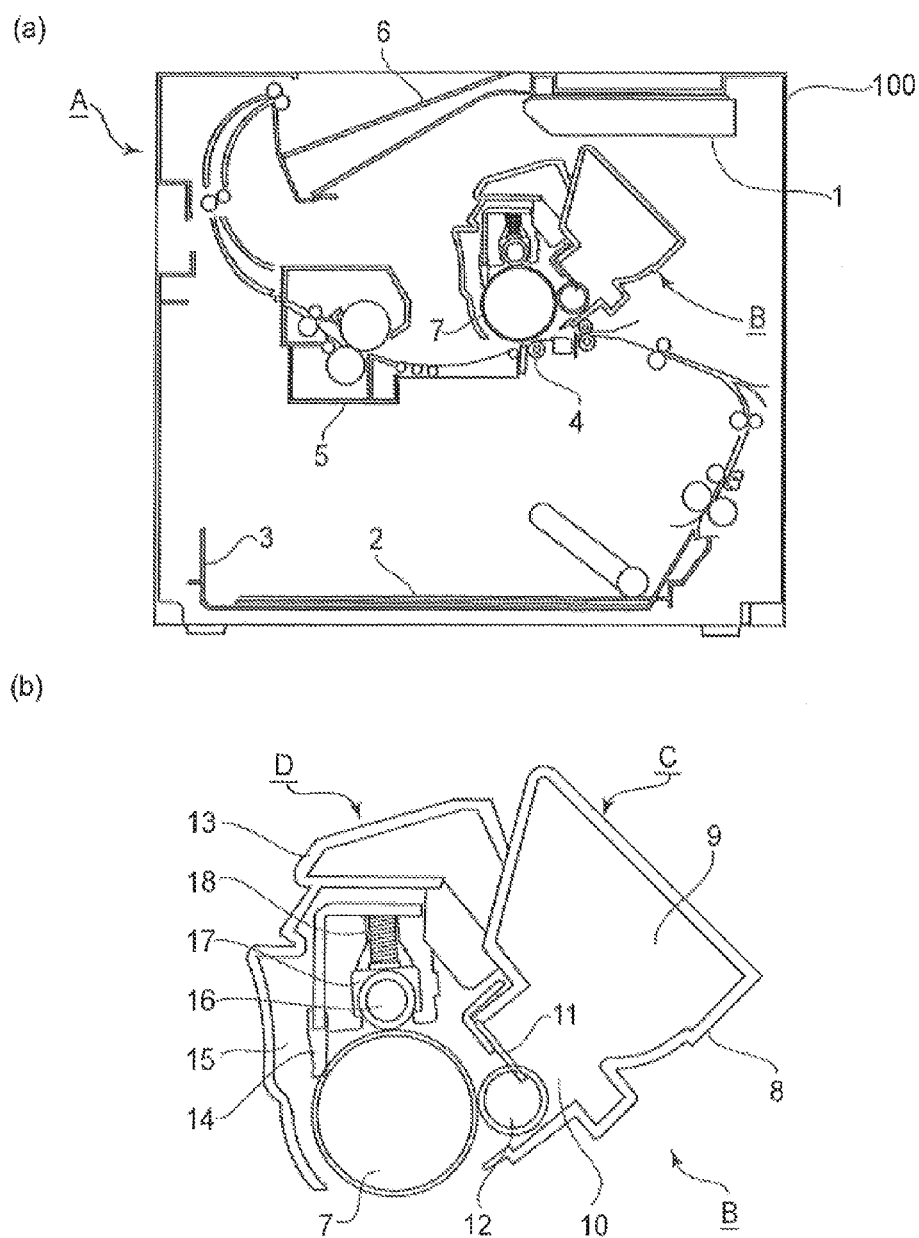
FIG. 2 includes views for illustrating a general arrangement of a process cartridge according to Embodiment 1.

Part (a) of FIG. 2 is a general arrangement view of an electrophotographic image forming apparatus A (laser beam printer) in which a process cartridge B in this embodiment is mounted. With reference to (a) of FIG. 2, the electrophotographic image forming apparatus A will be described. Part (a) of FIG. 2 is a schematic sectional view for illustrating the electrophotographic image forming apparatus A.

As shown in FIG. 2, in the electrophotographic image forming apparatus A, a photosensitive drum 7 as an electrophotographic photosensitive drum is irradiated with information light (laser light), on the basis of image information, from an optical device 1, so that a latent image is formed on the photosensitive drum 7. Then, this latent image is developed with a developer (toner) to form a toner image. In synchronism with formation of the toner image, a recording material 2 is conveyed from a feeding cassette 3 and the toner image formed on the photosensitive drum 7 is transferred onto the recording material 2 by a transfer roller 4. This transferred toner image is fixed on the recording material 2 by a fixing means 5 and thereafter the recording material 2 is discharged to a discharge portion 6.

[General Arrangement of Process Cartridge]

Next, with reference to (a) of FIG. 2 and (b) of FIG. 2, the process cartridge B will be described. Part (b) of FIG. 2 is a sectional view for illustrating a general arrangement of the process cartridge B in this embodiment.

The process cartridge B is constituted by rotatably connecting a developing unit C and a drum unit D relative to each other and is constituted detachably mountable to a main assembly 100 of the electrophotographic image forming apparatus A (hereinafter referred to as an apparatus main assembly). Here, the developing unit C is constituted by a developing means constituted by the toner (not shown) and a developing roller 12 and a developing (device) frame 8 for accommodating the toner and supporting the developing means. Further, the drum unit D is constituted by constituent members such as the photosensitive drum 7 and a cleaning blade 14 and a drum frame 13 for supporting these constituent members.

The toner accommodated in a toner accommodating portion 9 of the developing unit C is sent to a developing chamber 10, so that a toner layer to which a triboelectric charge is imparted by a developing blade 11 is formed on the surface of the developing roller 12. Then, the toner formed on the surface of the developing roller 12 is transferred onto the photosensitive drum 7 depending on the above-described latent image, so that the toner image is formed on the photosensitive drum 7. Then, after the toner image on the photosensitive drum 7 is transferred onto the recording material 2 by the transfer roller 4, the toner remaining on the photosensitive drum 7 is scraped off by the cleaning blade 14, so that the residual toner is collected (removed) in a residual toner container 15. Thereafter, the surface of the photosensitive drum 7 is uniformly charged by a charging roller 16 as a charging member (process means), so that a latent image formable state by an optical device 1 is created.

[General Arrangement of Drum Unit]

Figure 3:
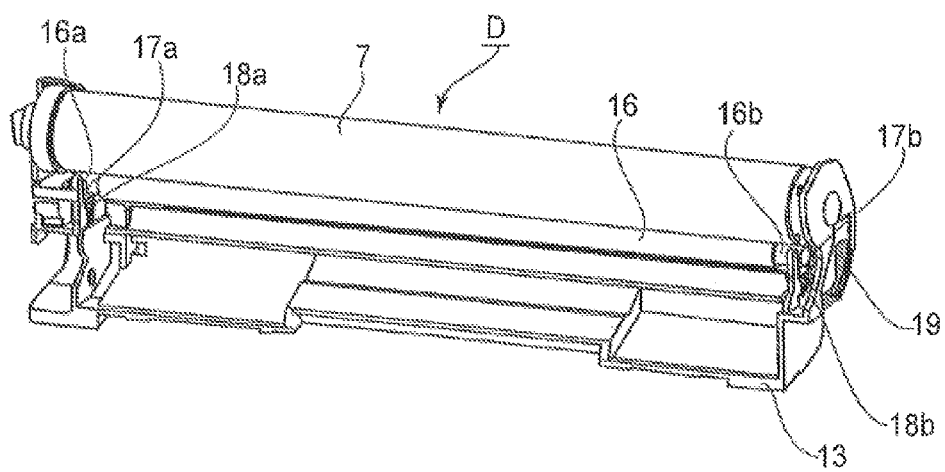
FIG. 3 includes views for illustrating a general arrangement of a drum unit according to Embodiment 1.
Figure 3:
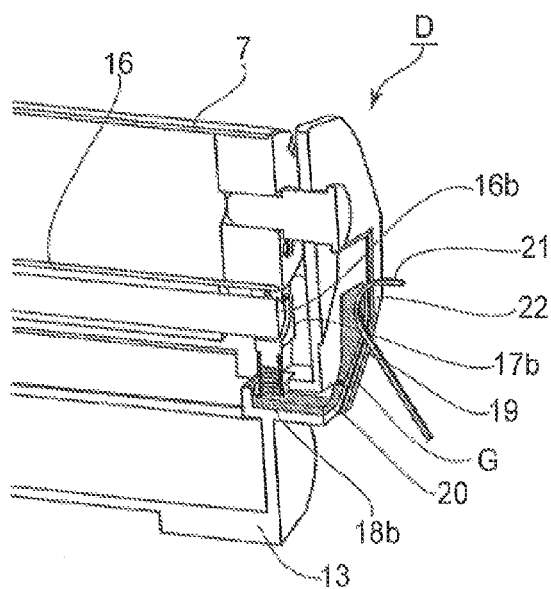
Figure 4:
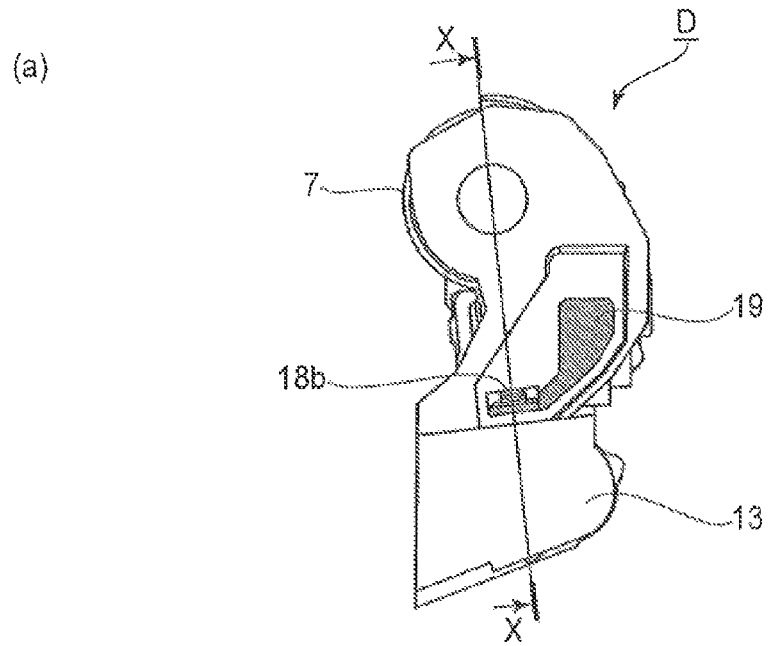
FIG. 4 includes views for illustrating the general arrangement of the drum unit according to Embodiment 1.
Figure 4:
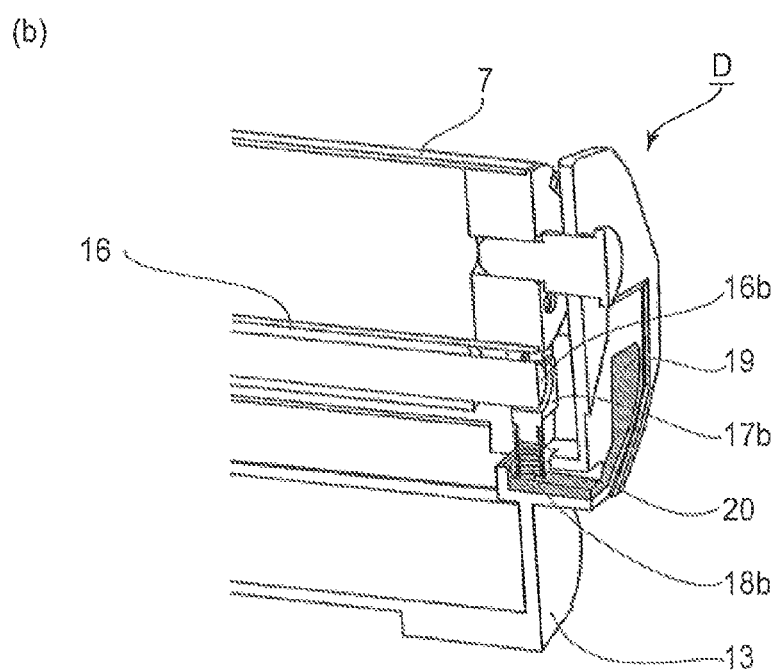

Part (a) of FIG. 3 is a general arrangement view of a portion relating to a charging process of the drum unit D, and (b) of FIG. 3 is a partially sectional view of a state in which the process cartridge B including the drum unit D is mounted in the apparatus main assembly 100. Part (a) of FIG. 4 is a schematic side view of the drum unit D, and (b) of FIG. 4 is a schematic perspective view showing the drum unit D cut along X-X cross-section shown in (a) of FIG. 4.

In the following, the general arrangement of the portion relating to the charging process of the drum unit D will be described. As shown in (a) of FIG. 3, the charging roller 16 for charging the surface of the photosensitive drum 7 is rotatably supported by a charging bearing (charging roller terminal) 17a and a charging bearing 17b constituted by an electroconductive material (e.g., electroconductive resin) at both end portions 16a and 16b of its core shaft. To the charging bearings 17a and 17b, compression springs (charging contact springs) 18a and 18b are mounted, respectively, so that the charging bearings 17a and 17b are mounted to the drum frame 13 in a state in which the compression springs 18a and 18b are capable of bearing compressed. Thus, the charging roller 16 is supported by the drum frame 13. Further, as shown in (b) of FIG. 4, when the photosensitive drum 7 and the charging roller 16 contact each other, the compression springs 18a and 18b are compressed, and the charging roller 16 is pressed against the photosensitive drum 7 with predetermined pressure by a spring force generated at this time.

Next, a charging method of the photosensitive drum 7 will be described. As shown in (b) of FIG. 4, the compression spring 18b which is a spring member as an electroconductive member contacts a bearing surface 20 which is a charging contact portion of a cartridge electrode portion (hereinafter referred to as an electrode portion) 19 formed of an electroconductive resin integrally molded with the drum frame 13. Further, the compressing spring 18b and the electrode portion 19 are in an electrically connectable state.

As shown in (b) of FIG. 3, when the process cartridge B is mounted in the apparatus main assembly 100, a main assembly electrode 21 which is a main assembly contact member provided on the apparatus main assembly 100 and the electrode portion 19 integrally molded with the drum frame 13 contact at an exposed contact portion 22. Then, when a voltage is outputted to the main assembly electrode 21 by a command from a controller (not shown) of the apparatus main assembly 100, the voltage is applied to the surface of the charging roller 16 via the electrode portion 19, the compression spring 18b, the charging bearing 17b and the end portion 16b of the core shaft. Then, the surface of the photosensitive drum 7 is uniformly charged by the charging roller 16. Thus, the electrode portion 19 is provided for electrically connecting the charging roller 16 and the main assembly electrode 21. That is, the electrode portion 19 forms an electrically path for electrically connecting the main assembly electrode 21 and the charging roller 16.

Further, although details will be described later, the electrode portion 19 is integrally molded with the frame 13 by injecting the recording material from a gate portion G which is an injection receiving portion.

Here, in this embodiment, the main assembly electrode 21 and the electrode portion 19 are directly connected but these portions may also be indirectly connected via another electroconductive member between the main assembly electrode 21 and the electrode portion 19. Further, in this embodiment, although the electrode portion 19 and the charging roller 16 are electrically connected via the charging bearing 17b and the compression spring 18b therebetween, the electrode portion 19 and the charging roller 16 may also have a constitution in which these portions are directly connected.

Further, in this embodiment, the case where the electrode portion 19 is applied to the charging process of the photosensitive drum 7 is described but the present invention is not limited thereto. That is, in all of constitutions, which need electrical connection, of the developing roller 12, a supplying roller (not shown) for supplying the developer to the developing roller, the drum 7, a detecting circuit (not shown) for a remaining toner amount, and the like, the cartridge electrode portion according to this embodiment can be applied.

[Electrode Portion Forming Method]

In the following, a forming method of the electrode portion (electrode member) 19 will be described. The electrode portion 19 is integrally molded with the drum frame 13 by injecting the electroconductive resin into an electrode forming portion 40 which is a space formed between the drum frame 13 and a mold 27 as an injection mold and which is a space for forming an electrode. Here, the electrode forming portion 40 is formed between the drum frame 13 and the metal mold 27 by disposing the mold 27 in contact to the drum frame 13. Further, the metal mold 27 is provided as a separate member from the drum frame 13 in order to mold a shape of the electrode portion 19 (see (b) of FIG. 8). Incidentally, the metal mold 27 is injected from the outside to the inside of the drum frame 13.

Figure 5:
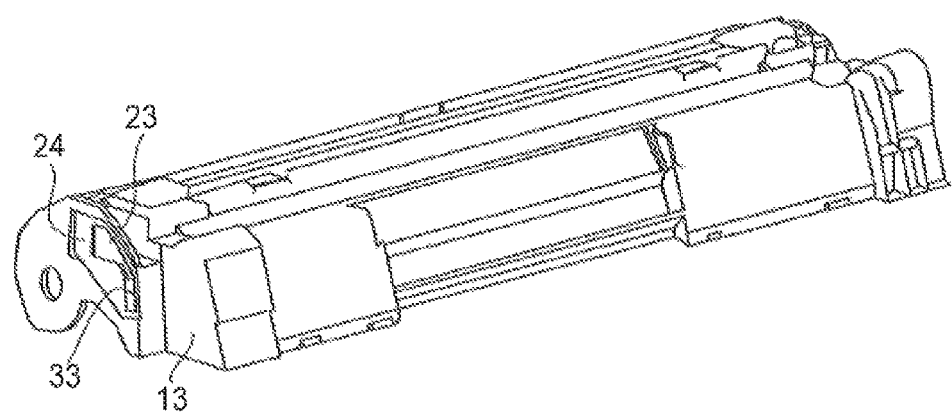
FIG. 5 includes views for illustrating an electrode forming portion of a drum frame according to Embodiment 1.
Figure 5:
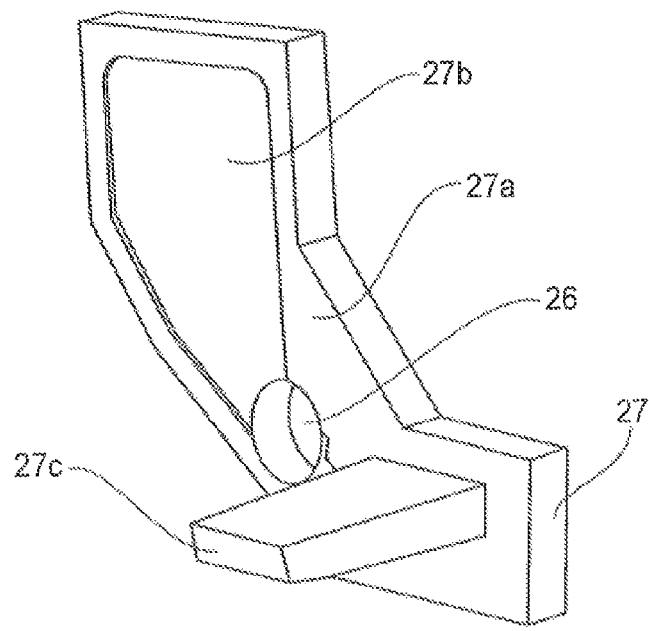

Part (a) of FIG. 5 is a schematic perspective view of the electrode forming portion of the drum frame 13, and (b) of FIG. 5 is a view showing the mold 27 to be contacted to the drum frame. Part (a) of FIG. 6 is a schematic side view of the drum frame 13, and (b) of FIG. 6 is a schematic perspective view showing the drum frame 13 cut along Y-Y cross-section shown in (a) of FIG. 6.

In the following, the electrode forming portion 40 of the drum frame 13 before the electrode portion 19 is molded, and the mold 27 will be described.

Figure 6:
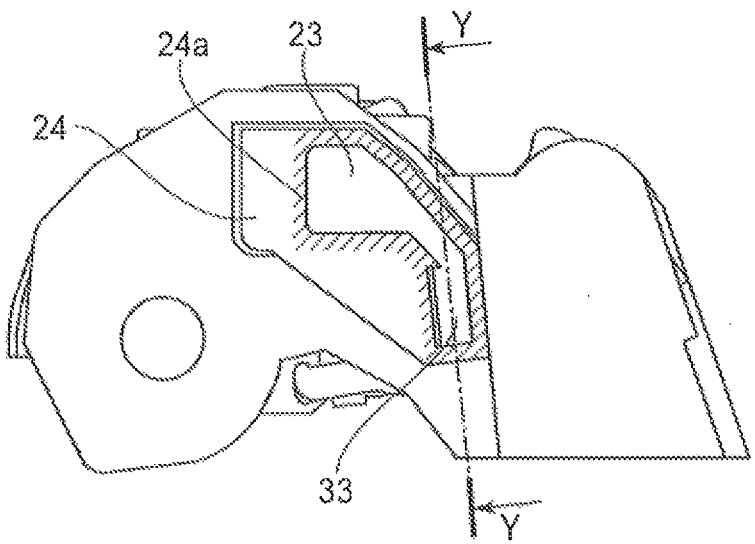
FIG. 6 includes views for illustrating the drum frame according to Embodiment 1.
Figure 6:
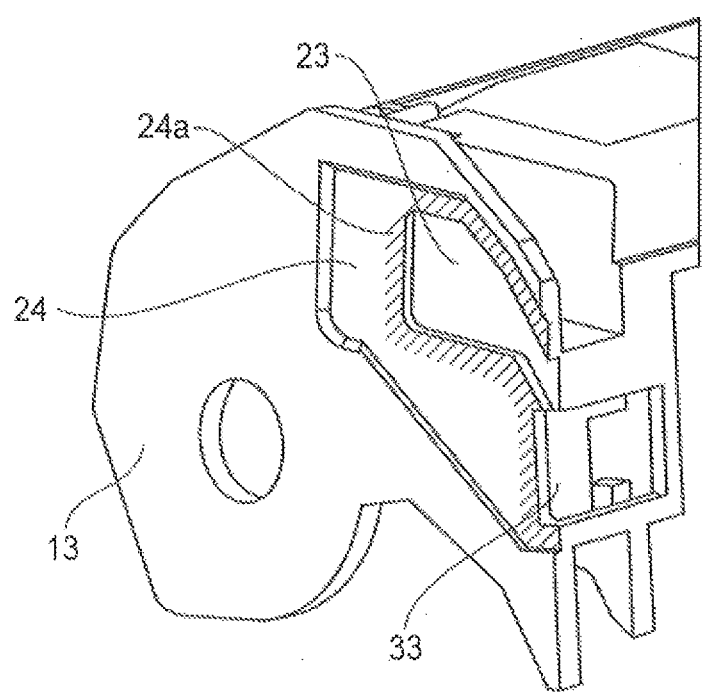

As shown in (a) of FIG. 5 and (a) and (b) of FIG. 6, at a surface where the electrode portion 19 of the drum frame 13 is to be molded, a recess 23 into which the resin is to be injected and a mold contact surface 24 including a mold contact portion 24a (indicated by hatched lines in (a) and (b) of FIG. 6) to which the mold 27 to be contacted are provided. Further, at a part of the drum frame 13, a mold injection part 33 (described later), which communicates with the recess 23 constituting the electrode forming portion 40, for molding the bearing surface 20 for receiving the compression spring 18b is provided.

As shown in (b) of FIG. 5, as the mold 27, the mold contact surface 27a, a digging portion 27b into which the electroconductive resin is to be injected, a projection 27c for molding the bearing surface 20 for receiving the compression spring 18b, and the like are integrally provided.

Figure 7:
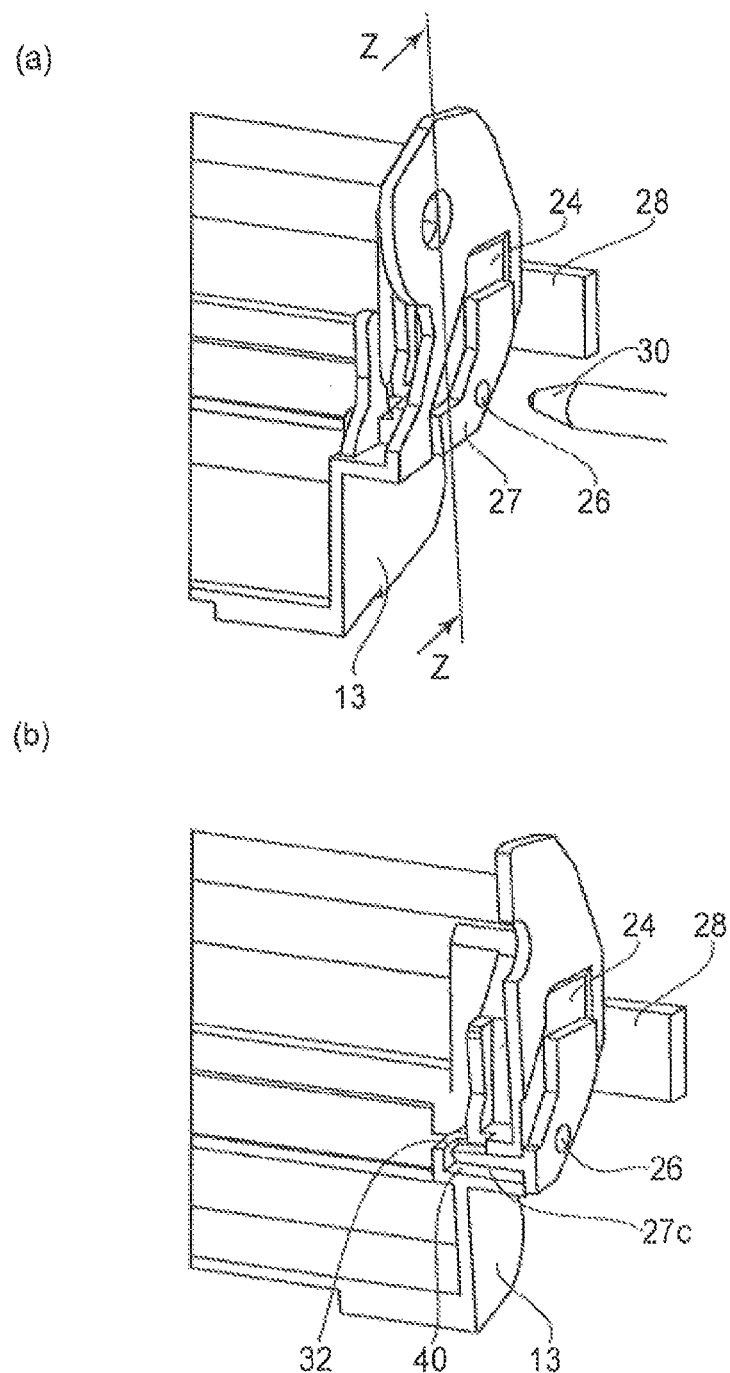
FIG. 7 includes views for illustrating a state in which a mold is contacted to the drum frame.

Part (a) of FIG. 7 is a schematic perspective view of a state the mold 27 is contacted and clamped to the drum frame 13, and (b) of FIG. 7 is a schematic perspective view cut along Z-Z cross-section shown in (a) of FIG. 7. Part (a) of FIG. 8 is a view for illustrating back-up during the clamping, and (b) of FIG. 8 is a schematic sectional view for illustrating the back-up during the clamping.

In the following, a clamping method in a process (step) of molding the electrode portion 19 will be described.

When the electrode portion 19 is molded, as shown in (a) of FIG. 7 and (b) of FIG. 7, the clamping is effected by bringing the mold 27 into contact to the mold contact surface 24 of the drum frame 13. During the clamping, as shown in (a) of FIG. 8 and (b) of FIG. 8, a back side of the mold contact surface 24 is supported by a back-up member (back-up mold) 28. This is because the mold contact portion 24a of the drum frame 13 and a frame contact surface 27a of the mold 27 are prevented from being deviated (escaped) by and the drum frame 13 is prevented from being deformed by a pressing force of the mold 27 and a resin pressure P during resin injection. In this embodiment, the supporting portion supports the back side (back surface) of the mold contact surface 24 but may also be a portion capable of suppressing the deviation and deformation of the drum frame 13 by supporting the mold contact surface 24 at a side (surface) other than the back surface (back surface).

Figure 1:
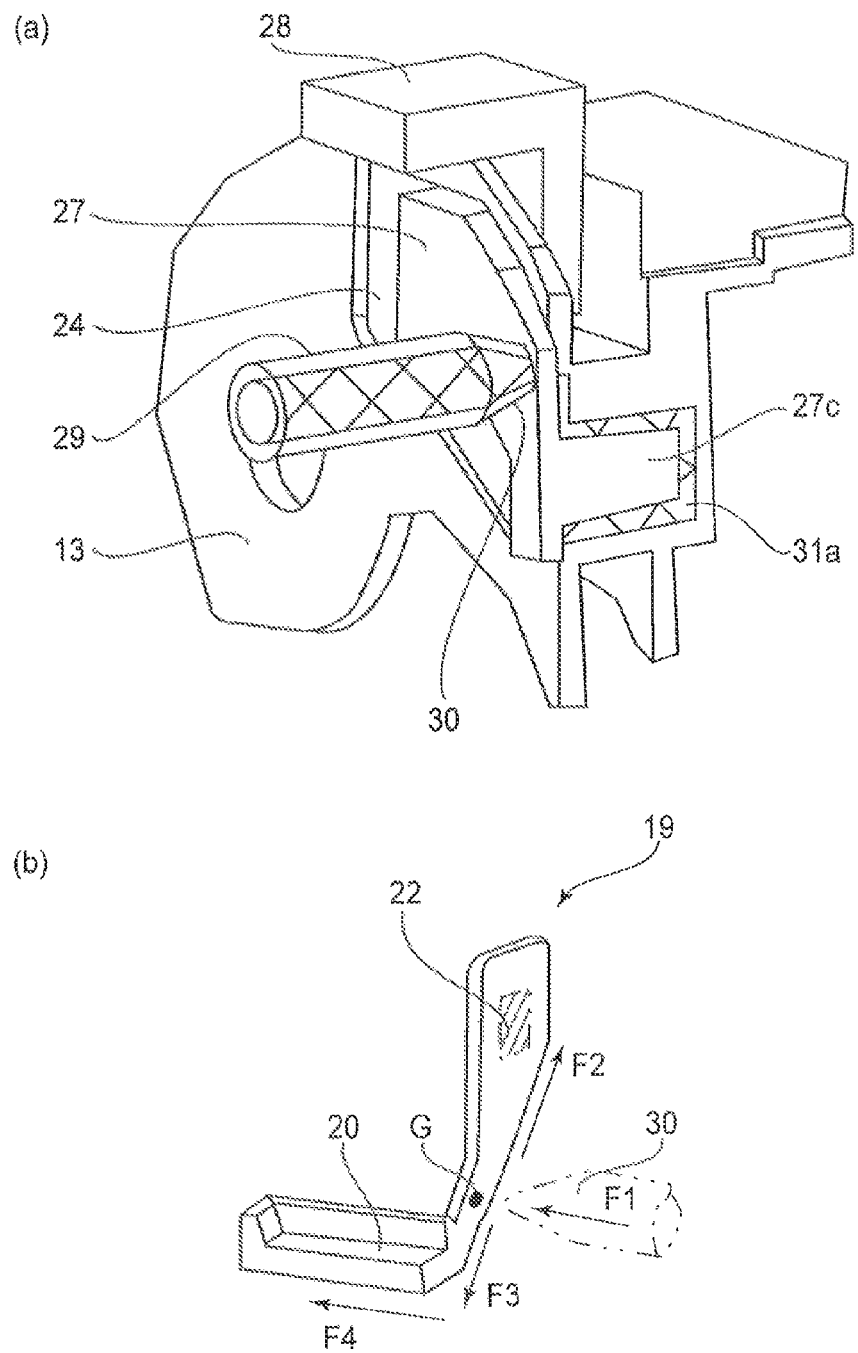
FIG. 1 includes views for illustrating the time of completion of inject of an electroconductive resin for forming an electrode portion according to Embodiment 1.
Figure 8:
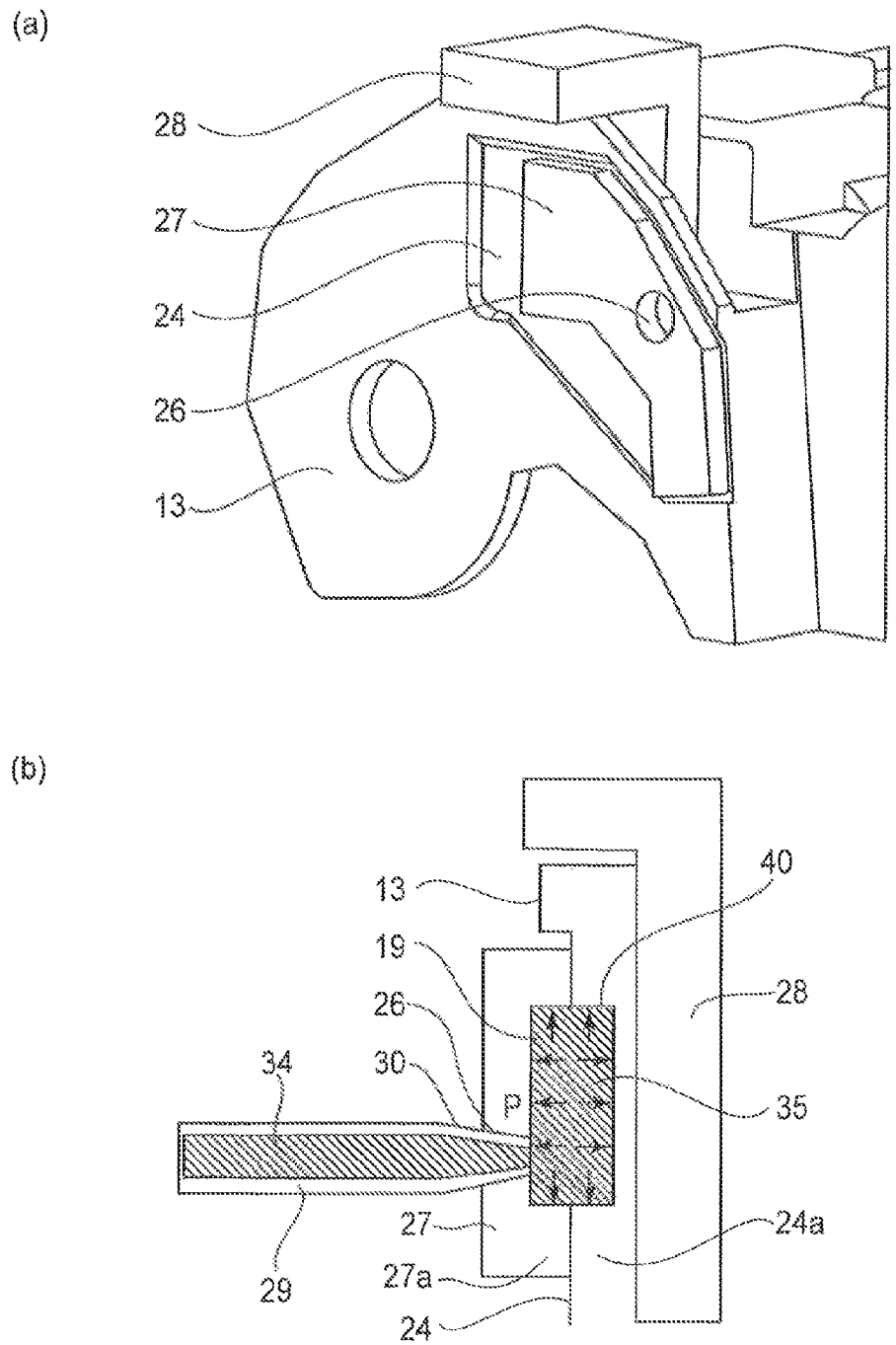
FIG. 8 includes views for illustrating back-up.
Figure 9:
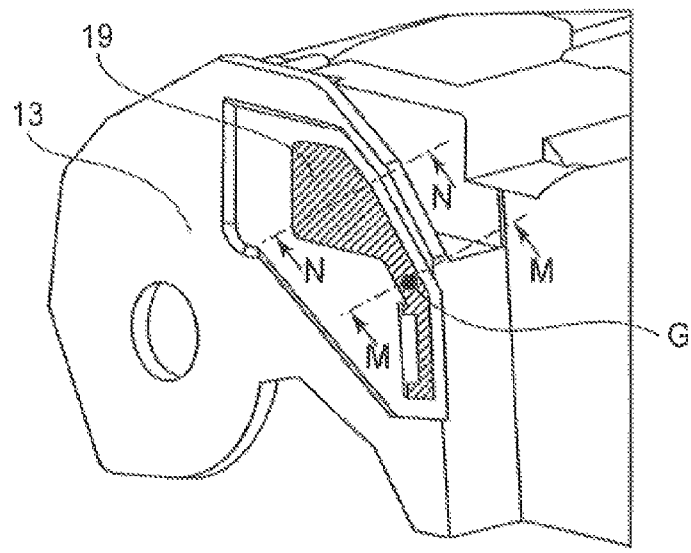
FIG. 9 includes views for illustrating electroconductive resin injection according to Embodiment 1.
Figure 9:
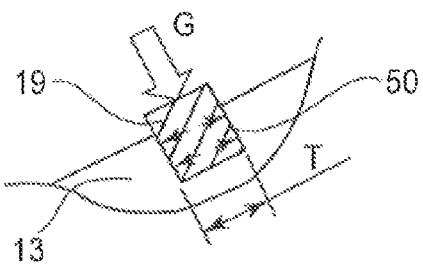
Figure 9:
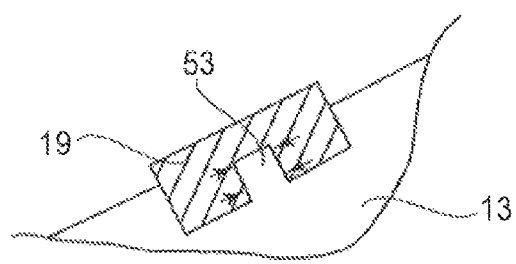
Figure 10:
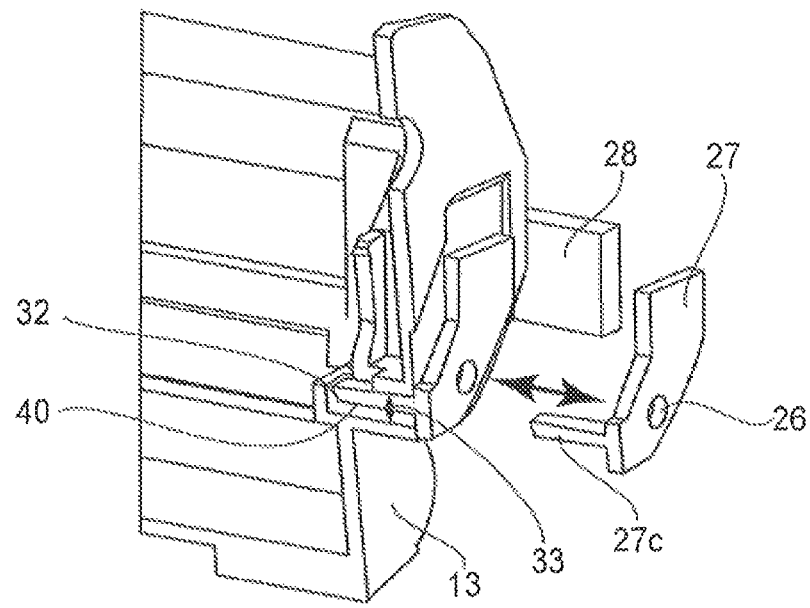
FIG. 10 includes views for illustrating motion of the mold before and after the electroconductive resin injection according to Embodiment 1.
Figure 10:
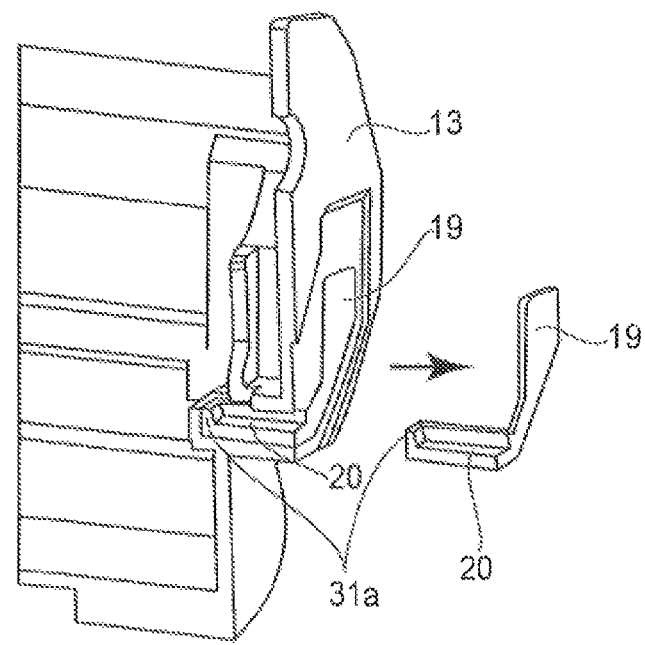

Part (a) of FIG. 1 is a schematic perspective view of a cross-section of a portion of the drum frame 13 in a state in which an injection end portion 30 of a resin injecting device 29 is contacted to an injection port 26 of the mold 27 shown in (a) of FIG. 8. Part (b) of FIG. 8 is a partially sectional view of the drum frame 13 in a state in which the injection end portion 30 of the resin injecting device 29 is contacted to the injection port 26 to inject the resin. Part (a) of FIG. 9 is a schematic perspective view of the drum frame 13 after the mold is opened. Part (b) of FIG. 9 is M-M cross-sectional view of (a) of FIG. 9, and (c) of FIG. 9 is N-N cross-sectional view of (a) of FIG. 9. Parts (a) and (b) of FIG. 10 are views including the Z-Z cross-section of (a) of FIG. 7 and are views showing a partial cross-section of the drum frame 13 in the case where the drum frame 13 is viewed from an angle different from the angle in FIG. 1. Part (a) of FIG. 10 is a view showing motion of the mold 27 from the mold injection before the resin injection to the mold opening through the mold clamping, and (b) of FIG. 10 is a partially sectional view of the drum frame 13 showing the mold open state and is a partially sectional view during recycling described later.

In the following, a resin injecting method of the process of molding the electrode portion 19 will be described with reference to FIG. 1, (b) of FIG. 2, and FIGS. 8 to 10.

As shown in (a) of FIG. 10, at a part of the drum frame 13, the mold injection part 33, which communicates with the recess 23 (see (a) of FIG. 5) constituting the electrode forming portion 40, for molding the bearing surface 20 for receiving the compression spring 18b is provided. Then, the projection 27c of the mold 27 is injected into the injection port 33 to bring the mold 27 into contact to the drum frame 13 with respect to the substantially vertical direction (in a left direction of an arrow in the figure) at contact portion 22, provided on the drum frame 13, for electrically connecting the mold 27 to the image forming apparatus main assembly by injecting the projection 27c of the mold 27 into the injection port 33.

Next, in a state in which the injection end portion 30 of the resin injecting device 29 is contacted to the injection port 26 of the mold 27, shown in (a) of FIG. 8, as shown in (b) of FIG. 8, a melted electroconductive resin 34 is injected into the electrode forming portion 35 which is the space formed by the drum frame 13 and the mold 27.

Next, the resin injecting device 29 is separated from the injection port 26 of the mold 27 and further as shown in (a) of FIG. 10, the mold 27 is separated in a right direction of the arrow in the figure, so that as shown in (a) of FIG. 9, the electrode portion 19 is in a state in which it is formed integrally with the drum frame 13.

Part (b) of FIG. 9 is the M-M cross-sectional view of (a) of FIG. 9.

An inject flow passage of the melted resin from the resin injecting device 29 has a width T, of the recess 50 of the drum frame 13 in the neighborhood of the gate portion G as the inject receiving portion, set at about 2.5 mm narrower than other portions. This is because as shown by arrows in (b) of FIG. 9, an inner resin pressure during the resin injection is enhanced, so that a contraction amount after cooling is brought near to zero as closer as possible. By doing so, a bonding force (adhesive force) of electroconductive POM (polyacetal) to the drum frame 13 of PS (polystyrene) is enhanced, thus enabling integral molding. Therefore, when the cartridge is vibrated and dropped, it is possible to prevent the electrode portion 19 from being disconnected from the drum frame 13. As a result, there is no need to intentionally provide a retaining portion and therefore there is no need to provide an undercut portion (retaining portion) to the drum frame 13 with respect to an arrow direction of (b) of FIG. 10. Further, during the recycling, when the electrode portion 19 is pulled out from the drum frame 13 in the arrow direction (one direction) with a force of not less than a predetermined value, the electrode portion 19 is demountable in an opposite direction to an injection direction of the mold 27 into the drum frame 13. Up to here, the case where the resin injecting device and the mold 27 are separate members is described but of course the members may also be integrally provided.

The molding of the electrode portion 19 will be further described and in the following, a positional relation between the mold 27 and the frame 13 before the resin injection will be described with reference to (a) and (b) of FIG. 10 which are views including the Z-Z cross-section of (a) of FIG. 7.

In the drum frame 13, at a downstream-side terminal portion with respect to an electroconductive resin injection direction from the injection port 26 to the electrode forming portion 40, a buffer portion 32 as an accommodating portion for accommodating the resin extruded from the electrode forming portion 40 is provided. As shown in (b) of FIG. 10, the resin 34a extruded from the electrode forming portion 40 flows into and remains at the buffer portion 32 which is a spacing between the frame 13 and the projection 27c, so that the resin injection into the electrode forming portion 40. Incidentally, in this Embodiment 1, the buffer portion 32 is provided at the downstream-side terminal portion of the electrode forming portion 40 but is not limited thereto and may also be provided at an intermediate portion of the electrode forming portion 40. That is, the buffer portion 32 may be provided to the drum frame 13 in order to accommodate (hold) the resin extruded from the drum frame 13.

Further, during the resin injection, the clamping is effected in a state in which the projection 27c, having a flat surface portion, provided at the part of the mold 27 is injected into the mold injection port 33 provided to the drum frame 13. For this reason, as shown in (a) and (b) of FIG. 10, when the mold opening is made after completion of the resin injection, the bearing surface 20 of the electrode portion 19 constituted by the electroconductive resin is formed. The bearing surface 20 of the electrode portion 19 is the bearing surface for receiving the compression spring 18b when the compression spring 18b is assembled later, thus constituting a contact portion for electrically connecting the compression spring 18b and the electrode portion 19.

When the description is supplemented with reference to (b) of FIG. 3, the electrode portion 19 includes a contact portion (surface) 22 as a first contact portion exposed to the outside of the drum frame 13 and the bearing surface 20 as a second contact portion exposed toward a direction crossing a direction in which the first contact portion is exposed. The contact portion 22 is a surface to which the main assembly electrode 21 as the main assembly contact is to be electrically connected when the process cartridge B is mounted in the image forming apparatus main assembly A. Further, the bearing surface 20 constitutes a receiving portion, of the compression spring 18b, for being electrically connected to the compression spring 18b and the charging bearing 17b.

Figure 11:
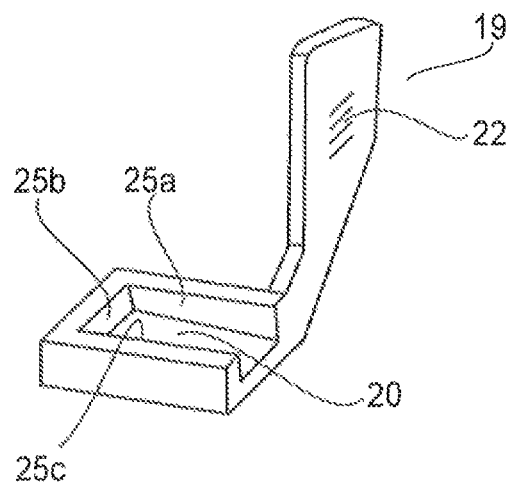
FIG. 11 includes views for illustrating a function of an electrode portion.
Figure 11:
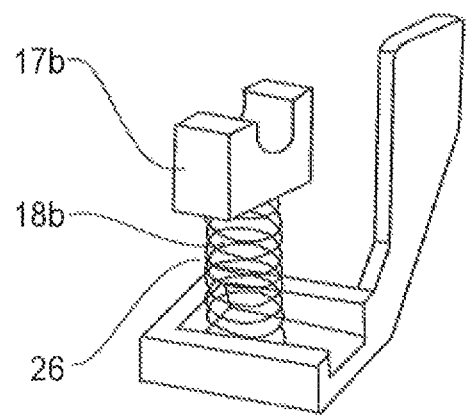

By using (a) of FIG. 11 and (b) of FIG. 11, the electrode portion 19 will be further described. Positioning of an outer diameter portion 26 of the compression spring 18b of a unit member (electroconductive member) including the compression spring 18b and the charging bearing 17b is effected as follows. That is, the positioning of the outer diameter portion 26 of the compression spring 18b is effected at least a portion of electroconductive member positioning portions 25a, 25b and 26c provided to the electrode portion 19 having the contact portion 22 (a hatched portion in the figure) to be electrically conducted to the image forming apparatus main assembly.

Further, also the bearing surface 20 constituting the receiving portion of the above-described compression spring 18b is formed to determine a spring force of the compression spring 18b for urging the charging roller 16 at the process means against the photosensitive drum 7 as the image bearing member at a certain pressure.

In this embodiment, the above-described electroconductive member positioning portion 25b also has the function as the buffer portion 32 for accommodating the extruded resin 34a.

In this embodiment, the recess 23 is provided to the electrode forming portion 40 in order to facilitate the integral mold of the electrode portion 19 with the drum frame 13 but the present invention is not limited thereto. As another method for obtaining (enhancing) the bonding force by using a different material, as shown in (c) of FIG. 9 which is the N-N cross-sectional view of (a) of FIG. 9, a projection 53 is provided to the frame 13 and a compression force (indicated by arrows in the figure) of the electroconductive resin material may also be utilized. This is also a method for increasing a contact area of a surface parallel to the pulling-out direction to increase the bonding force in the case where a material for the drum frame 13 and a material for the electrode portion 19 have no or low compatibility (affinity).

Further, the projection 53 further achieves the effect by being provided substantially parallel to a flowing direction of the electroconductive resin. This is because the binding force to the drum frame 13 can be increased by utilizing a higher coefficient of contraction with respect to a direction perpendicular to the resin flowing direction than that with respect to the resin flowing direction without hindering the flowing of the resin.

Further, at the electrode portion 19, the electroconductive resin injected from the gate portion G as the inject receiving portion to an arrow F1 direction is branched into and changed in direction to flow into an arrow F2 direction and an arrow F3 direction as shown in (b) of FIG. 1, FIG. 9 and FIG. 11. Then, the electroconductive resin changed in direction to the arrow F2 direction molds the contact portion 22 as the first contact portion. The electroconductive resin changed in direction to the arrow F3 direction further charges its direction to a direction (arrow F4) substantially perpendicular thereto and flows, so that the bearing surface 20 as the second contact portion is formed. Then, the main assembly contact 22 and the charging roller 16 as the process means are electrically connected to form an electrode path. By employing such a constitution, an electroconductive property between the contact portion 22 and the bearing surface 20 is improved. That is, although described later, by the flow of the electroconductive resin injected from the gate portion G and changed in direction, a distribution and orientation of an electroconductive material (electroconductive filler) contained in the electroconductive resin become random. The electroconductive resin is placed in such a state, so that the resultant electrode has the electroconductive property better than that of an electrode extending only in a direction in which the electroconductive resin is injected from the gate portion.

[Embodiment 2]

Next, Embodiment 2 will be described.

Figure 12:
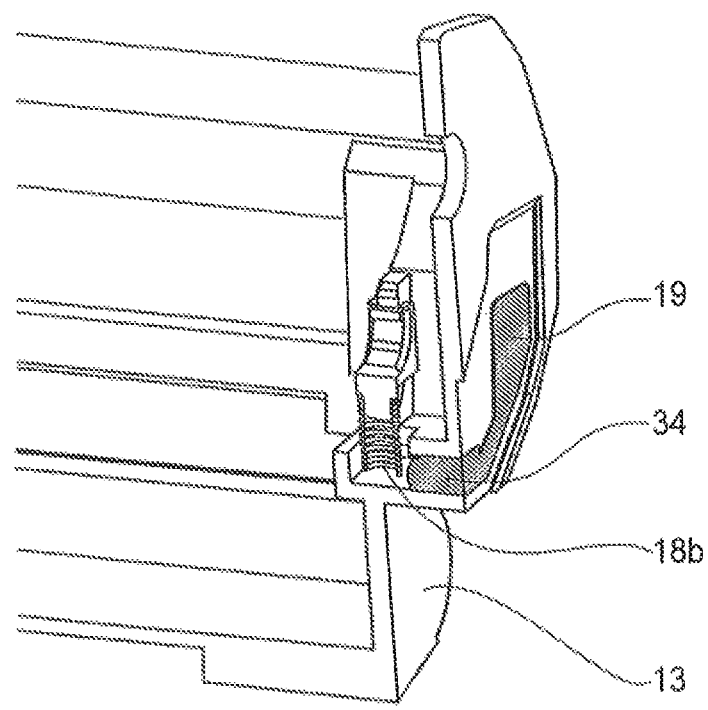
FIG. 12 is a view for illustrating an electrode portion according to Embodiment 2.

FIG. 12 is a view for illustrating a state in which the electroconductive resin 34 is injected in a state in which the compression spring 18b is assembled into the drum frame 13 in advance. Further, in Embodiment 1, assuming that the compression spring 18b is assembled after the electrode portion 19 is molded, the positioning portions 25a, 25b and 25c for receiving the compression spring 18b are provided. On the other hand, as shown in FIG. 12, in a state in which the compression spring 18b as the electroconductive member is assembled into the drum frame 13 in advance, the electroconductive resin 34 may also be injected and fixed. At that time, the resin 34 is injected so that the injected resin 34 is contacted to the compression spring 18b to ensure the electric connection. Further, in the case where the electroconductive resin 34 is injected so as to contact the compression spring 18b the resin 34 contacted to the compression spring 18b is prevented from influencing the spring pressure of the compression spring 18b. By appropriately adjusting the amount of the resin, the resin 34 can be contacted to the compression spring 18b. Further, a part of the compression spring 18b may also be buried with the resin 34 if the function of the compression spring 18b is ensured.

Further, the electrode portion in this embodiment electrically connects the charging roller 16 and the main assembly electrode 21 in the drum unit D but the present invention is not limited thereto. The electrode portion may also electrically connect, e.g., the photosensitive drum 7 as the image bearing member and the apparatus main assembly 100 in the drum unit D. Further, the electrode portion may also be provided correspondingly to each of the photosensitive drum 7 and the charging roller 16. That is, the electrode portion for electrically connecting the charging roller 16 and the apparatus main assembly 100 and the electrode portion for electrically connecting the photosensitive drum 7 and the apparatus main assembly may also be provided. Further, the charging roller 16 and the electrode portion, and the photosensitive drum 7 and the electrode portion may also be, respectively similarly as described above, constituted so as to be electrically connected via the compression spring 18b or directly.

Further, this embodiment was described by using the drum unit D, but the electrode portion may also be applied to the developing unit C. Further, the electrode portion may also be applied to a process cartridge prepared by integrally assembling the electrophotographic photosensitive drum and a plurality of process means acting on the photosensitive drum into a cartridge. In the case where the electrode portion is applied to such a process cartridge, the electrode portion may also be provided in a plurality of electrode portions correspondingly to each of the electrophotographic photosensitive drum and the plurality of recording material. Also the electrical connection to the electrode portion in the constitution of the electrophotographic photosensitive drum and the plurality of process means may be constituted, similarly as described above, so as to be made via the compression spring 18b or directly. Further, to the image forming apparatus A in this embodiment, one process cartridge B was detachably mountable. However, the image forming apparatus A may also be color image forming apparatus, for forming a color image, to which a plurality of process cartridges or developing cartridges are detachably mountable.

As described above, according to this embodiment, compared with a conventional embodiment, the electrode portion is molded by injecting the electroconductive resin into the frame and therefore it is possible to eliminate a handling problem such that entanglement, deformation and the like of the electrode portion which are concerned about an occurrence thereof during the assembling.

Further, in the conventional embodiment, the frame of the cartridge was required to be provided with openings, positioning holes, cut-away portions and the like for mounting the electrode portions and therefore there was a possibility of a lowering in strength of the frame. On the other hand, according to this embodiment, into the holes or the like, of the frame, provided as the electrode forming portion, the resin is injected and therefore such holes can be filled with the resin, so that it is possible to suppress the lowering in strength of the frame. Further, the electrode portion is molded by branching the flow passage from the gate portion when the electroconductive resin is injected into the frame, so that improvement in electroconductive property of the electrode portion can be realized.

[Embodiment 3]

Next, Embodiment 3 will be described.

Hereinbelow, examples of constitutions of a process cartridge according to Embodiment 3, a developing unit, an electrical contact portion (hereinafter referred to as a contact portion) and a molding method will be described with reference to figures.

[General Arrangement of Process Cartridge]

Figure 14:
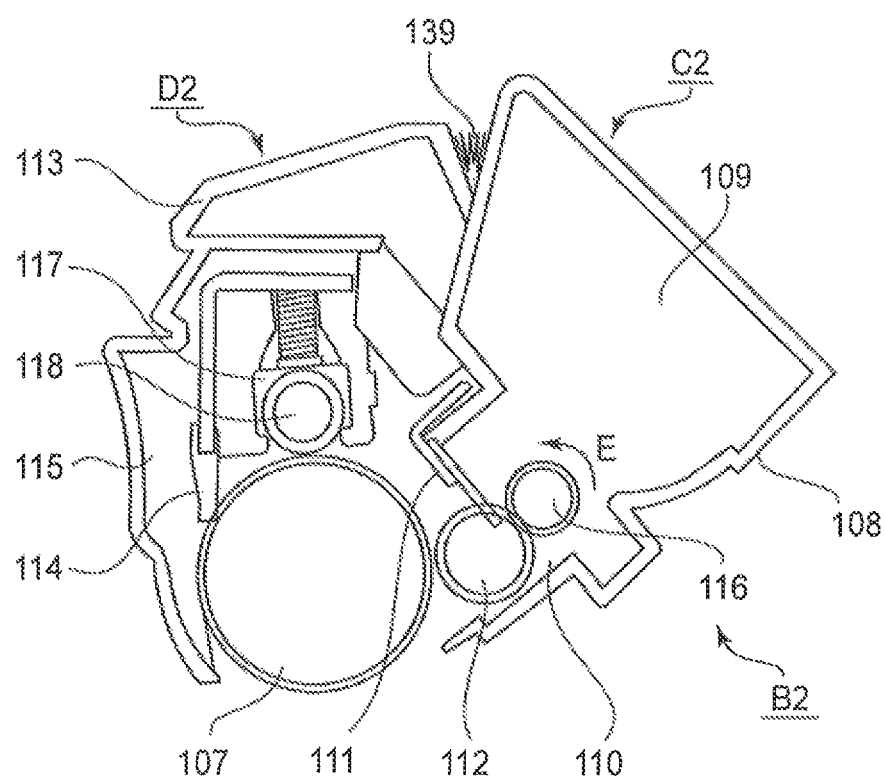
FIG. 14 is a sectional view of a process cartridge.

FIG. 14 is a sectional view for illustrating a process cartridge B2 in this embodiment. This process cartridge B2 is detachably mountable to the apparatus main assembly 100 shown in Embodiment 1. The process cartridge B2 is constituted by rotatably connecting a developing unit C2 and a drum unit D2 relative to each other. Here, the developing unit C2 is constituted by a developing means constituted by the toner (not shown) and a developing roller 112, a toner supplying roller 116, a developing (device) frame 108 supporting there rollers and a toner accommodating portion, for accommodating the toner, constituted by the developing frame 108. Further, the drum unit D2 is constituted by a photosensitive drum 107, a cleaning blade 114 and a drum frame 113 for supporting these members.

The toner accommodated in a toner accommodating portion 109 of the developing unit C2 is sent to a developing chamber 110. Then, the toner is supplied to a toner supplying roller 116 which is disposed at a periphery of the developing roller 112 and rotates in an arrow E direction in contact to the developing roller 112 and is supplied to the developing roller 112. Then, a layer thickness of a toner layer on the developing roller 112 is regulated by a developing blade 111. Then, the toner layer formed on the surface of the developing roller 112 is transferred onto the photosensitive drum 107, so that the electrostatic latent image formed on the photosensitive drum 107 is developed into a toner image. Further, the toner image on the photosensitive drum 107 is transferred onto the recording material (recording medium) 2 by the transfer roller 4 (see FIG. 2). Thereafter, the toner remaining on the photosensitive drum 107 is scraped off by the cleaning blade 114, so that the residual toner is collected (removed) in a residual toner accommodating chamber 115. Thereafter, the surface of the photosensitive drum 107 is uniformly charged by a charging roller 118 as a charging member (process means), so that a latent image formable state by an optical system 1 (see FIG. 2) is created.

[General Arrangement of Drum Unit]

A general arrangement of the drum unit will be described by using FIG. 14, FIG. 15 and FIG. 16.

Figure 15:
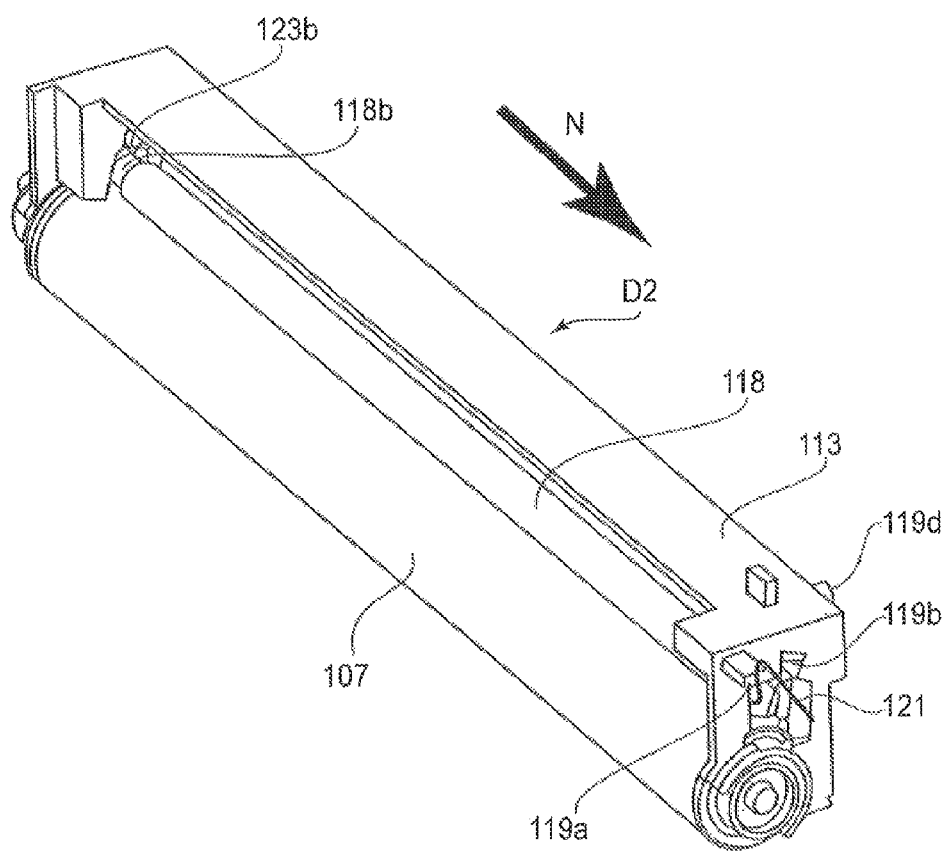
FIG. 15 is a perspective view in which a drum unit is contacted to a main assembly electrode.

FIG. 15 is an illustration of a portion relating to a charging process of the drum unit D2 in a state in which the process cartridge B2 is mounted in the image forming apparatus main assembly A. Part (a) of FIG. 16 is a side view (a view as seen from the downstream side of an arrow N in FIG. 15) in a side where the contact portion of the drum unit D2 is provided. Further, (b) of FIG. 16 is a sectional view of a periphery of a spring bearing surface forming portion cut along X2-X2 cross-section shown in (a) of FIG. 16, and (c) of FIG. 16 is a sectional view of a periphery of a contact surface cut along Y2-Y2 cross-section shown in (a) of FIG. 16.

Figure 16:
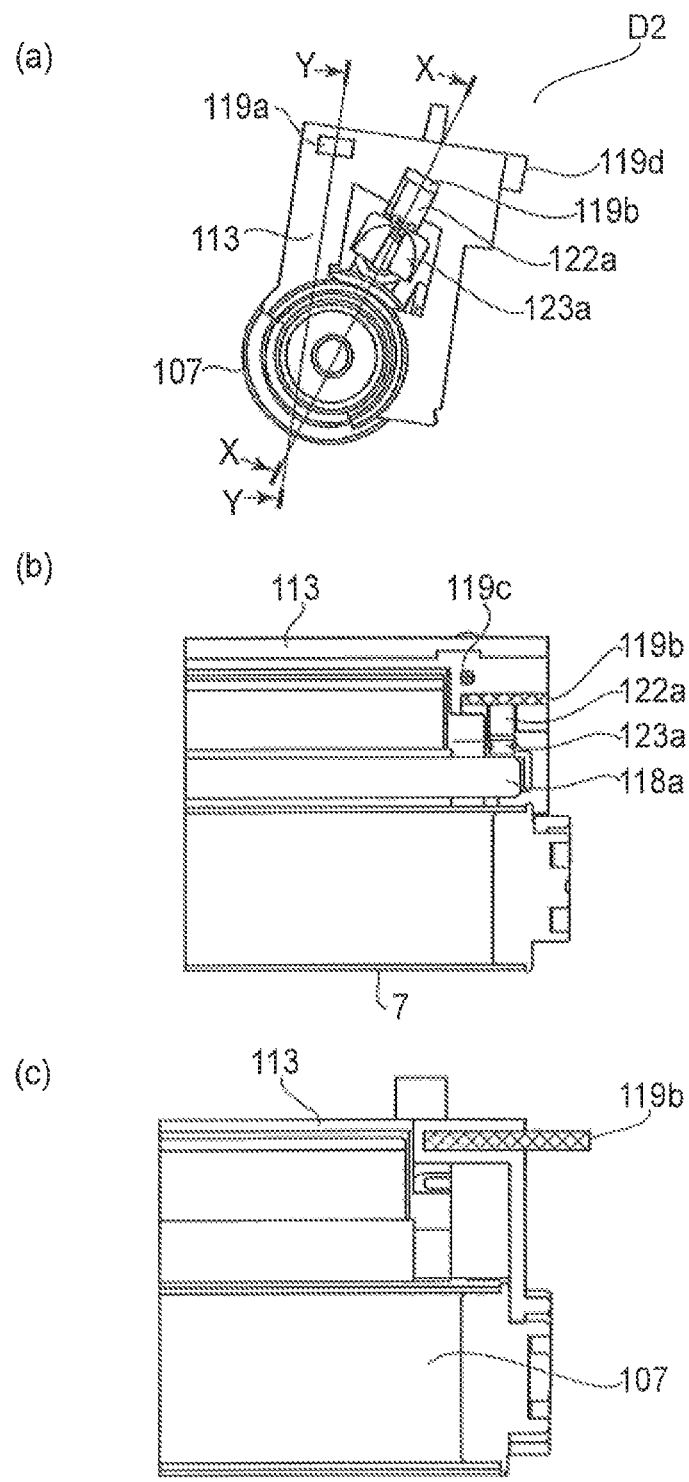
FIG. 16 includes sectional views of a peripheral of each of contact portions of the drum unit.

As shown in FIGS. 15 and 16, the charging roller 118 for charging the surface of the photosensitive drum 107 is rotatably supported by charging bearings 123a and 123b at both end portions 118a and 118b of its core shaft. The charging bearing 123a is constituted by an electroconductive material (e.g., electroconductive resin). Further, to the charging bearings 123a and 123b, compression springs 122a and 122b are mounted, respectively. The charging bearings 123a and 123b are mounted to the drum frame 113 in a state in which the compression springs 122a and 122b are capable of being compressed. Thus, the charging roller 118 is rotatably supported by the drum frame 113. Further, as shown in (b) of FIG. 16, when the photosensitive drum 107 and the charging roller 118 contact each other, the compression springs 122a and 122b are compressed, and the charging roller 118 is pressed against the photosensitive drum 10 with predetermined pressure by a spring force generated at this time.

[Contact Constitution and Voltage Applying Method of Drum Unit]

Figure 25:
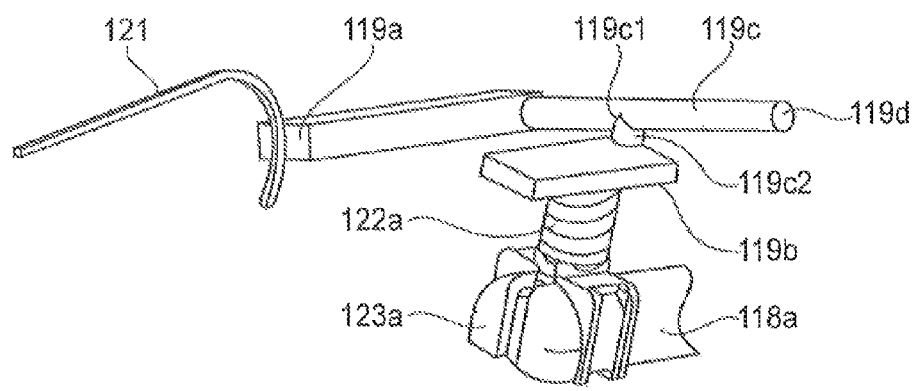
FIG. 25 includes general arrangements, of the electrode portion, showing a state of contact to the main assembly electrode.
Figure 25:
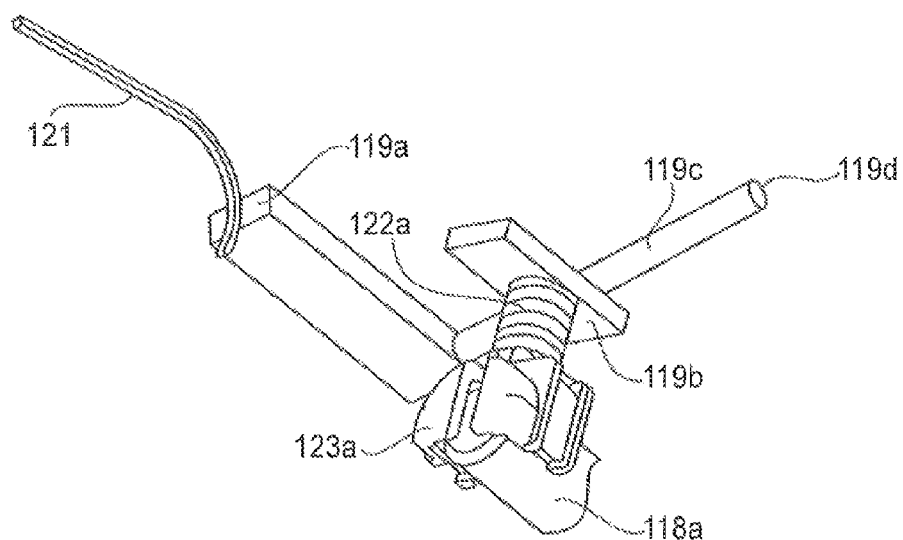
Figure 26:
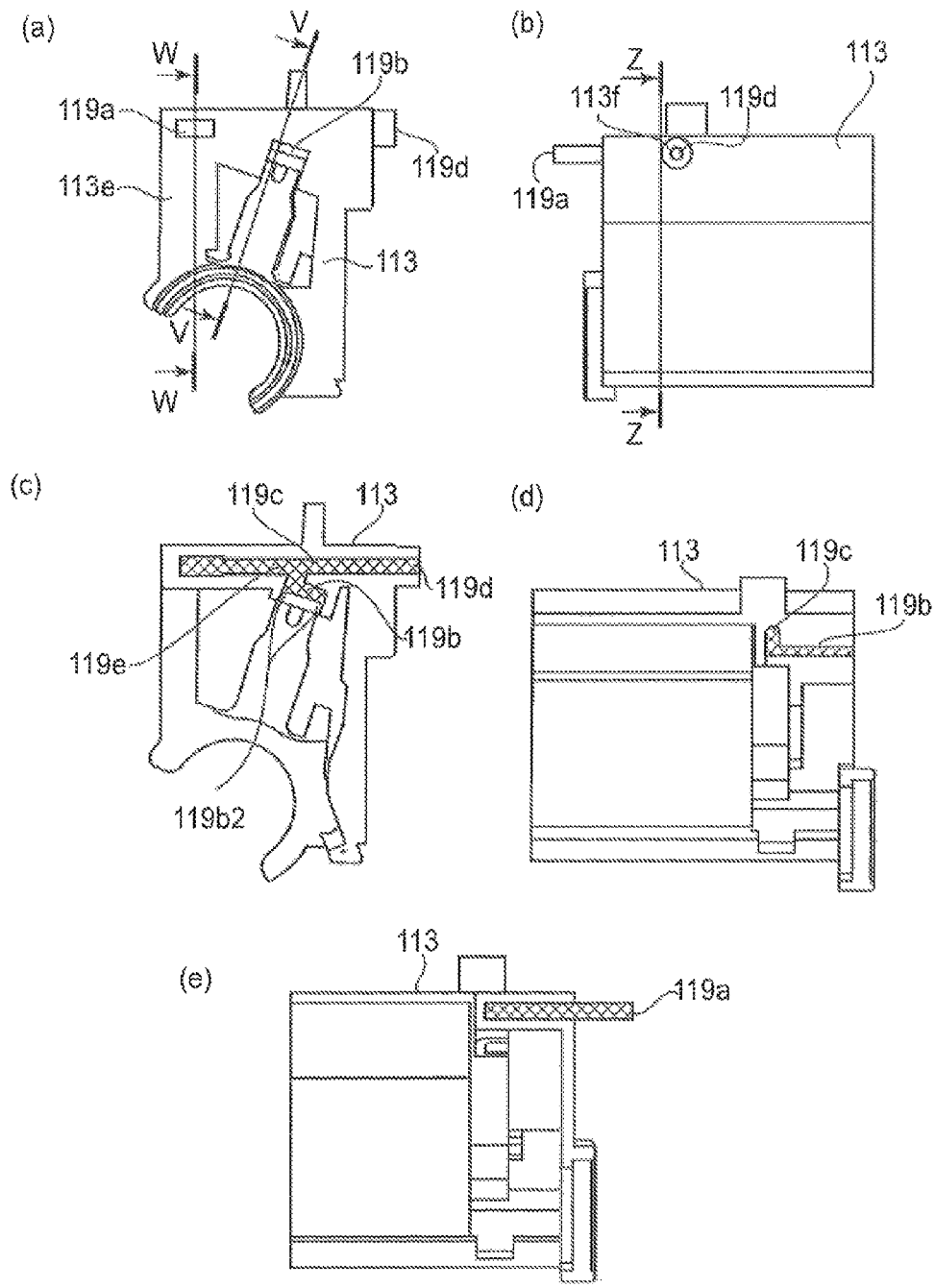
FIG. 26 includes illustrations of a state in which the contact portions are molded in the drum frame.

The charging method of the photosensitive drum 107 will be described by using FIG. 15, FIG. 16, FIG. 25 and FIG. 26. Further, although described later, an electrode portion 119 is formed by injecting an electroconductive resin 134 into a spacing formed when molds 127 and 128 are contacted to a drum frame 113 (see FIG. 13). FIG. 26 includes views for illustrating the cleaning frame 113 on which the electrode portion 119 is molded. As shown in FIG. 15, FIG. 16, FIG. 25 and FIG. 26, the electrode portion 119 is integrally molded with the drum frame 113. A specific molding method will be descried later. The electrode portion 119 includes a charging contact portion 119b as a first contact portion and an exposed contact portion 119a as a second contact portion. Further, although described later, the electrode portion 19 is consisting of the exposed contact portion 119a, the charging contact portion 119b, a first connecting portion 119c, a gate portion 119d as an inject receiving portion of the electroconductive resin, and a branch portion 119c1. The charging contact portion 119b is connected via a second connecting portion 119c2 branched from the first connecting portion 119c. Further, the exposed contact portion 119a and the charging contact portion 119b are connected via the second connecting portion 119c2 and the first connecting portion 119c. The exposed contact portion 119a is exposed from a side surface 113j of the drum frame 113 toward the outside. Further, when the process cartridge B2 is mounted in the image forming apparatus A, a main assembly electrode 121 provided in the apparatus main assembly 100 and the exposed contact portion 119a contact each other. On the other hand, the charging contact portion 119b contacts the compression spring 122a. Therefore, after the process cartridge B2 is mounted in the image forming apparatus A, by a command from a controller (not shown) provided in the apparatus main assembly 100, a voltage is applied to the main assembly electrode 121. Thus, the voltage is applied to the surface of the charging roller 118 via the exposed contact portion 119a, the connecting portion 119c, the charging contact portion 119b, the compression spring 122a, the charging bearing 123a of the electroconductive resin and a core shaft 118a. Then, the surface of the photosensitive drum 107 is uniformly charged by the charging roller 118. Thus, the electrode portion 119 electrically connects the charging roller 118 and the main assembly electrode 121.

Here, in this embodiment, the main assembly electrode 121 and the electrode portion 119 are directly connected but these portions may also be indirectly connected via another electroconductive member between the main assembly electrode 121 and the electrode portion 119. Further, in this embodiment, although the electrode portion 119 and the charging roller 118 are electrically connected via the charging bearing 123a and the compression spring 122a therebetween, the electrode portion 119 and the charging roller 118 may also have a constitution in which these portions are directly connected.

Further, in this embodiment, the case where the electrode portion 119 is applied to the charging process of the photosensitive drum 107 is described but the present invention is not limited thereto. That is, in all of constitutions, which need electrical connection of a remaining toner amount detecting circuit (not shown) or the like, in addition to an energization process to the developing roller 12 as the developing member, an energization process to the toner supplying roller and electrical connection to a drum earth (not shown), the electrode portion can be applied.

[Drum Frame]

Figure 17:
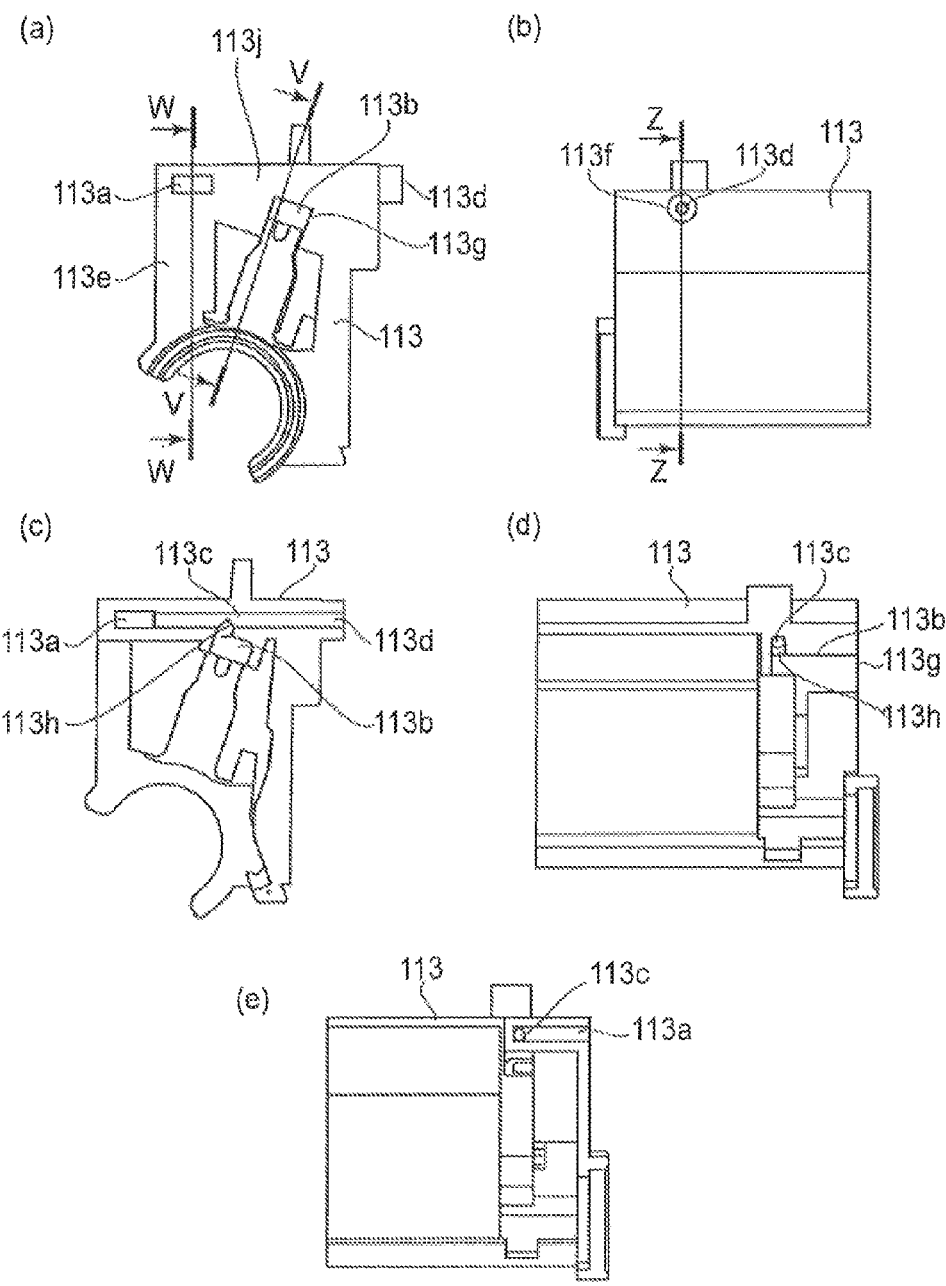
FIG. 17 includes illustrations of a drum frame shape.

A shape of the drum frame 113 will be described by using FIG. 16 and FIG. 17. FIG. 17 includes views showing the shape of the drum frame 113 before the electroconductive resin is injected. Part (a) of FIG. 17 is a side view of the side surface 113j where the exposed contact portion 119a of the drum frame 113 is formed, and (b) of FIG. 17 is a partial outer appearance view when the drum frame 113 is viewed from a gate 13d side. Part (c) of FIG. 17 is a sectional view when the drum frame 113 is cut at a position (Z-Z) shown in (b) of FIG. 17, (d) of FIG. 17 is a sectional view when the drum frame 113 is cut at a position (V-V) shown in (a) of FIG. 17, and (e) of FIG. 17 is a sectional view when the drum frame 113 is cut at a position (W-W) shown in (a) of FIG. 17. As shown in (a) and (c) of FIG. 17, the drum frame 113 includes a flow passage 113 in which the electroconductive resin for molding the exposed contact portion 119a will flow and a recess 113b for molding the charging contact portion 119b. Further, the drum frame 113 includes a contact surface 113e to which the mold 127 is to be contacted when the exposed contact portion 119a is molded and a contact surface 113f to which the mold 128 is to be contacted. Further, the drum frame 113 includes an injection part 113d for permitting the injection of the electroconductive resin 134. The drum frame 113 includes the flow passage 113c having a tunnel shape, and the flow passage 113c is branched into two flow passages at an intermediate branch portion 113h. The injection port 113d, the flow passage 113a and the recess 113b are connected via this branch portion 113h.

[Contact Portion Forming Mold]

Figure 18:
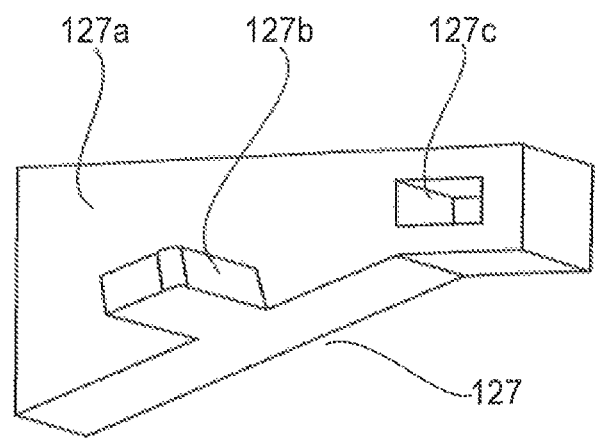
FIG. 18 is an illustration of a mold used when the electrode portion is formed.

By using FIG. 17, FIG. 18, FIG. 22 and FIG. 23, the molds for molding the electrode portion 119 will be described. FIG. 18 is a view showing the mold 127 which is one of two molds to be contacted to the drum frame 113.

Figure 22:
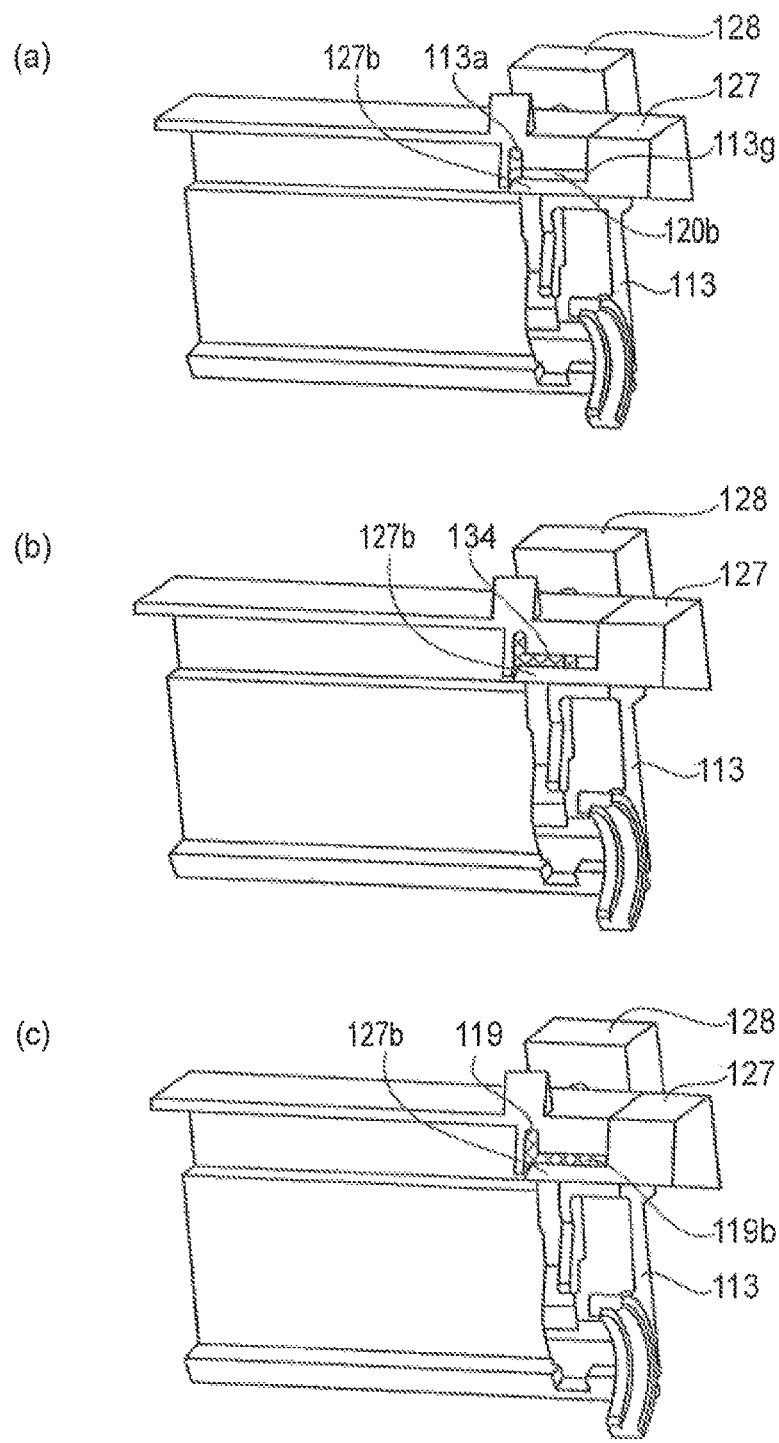
FIG. 22 includes sectional perspective views showing a state in which the electroconductive resin is injected when a charging contact portion is formed.

FIG. 22 includes sectional views when the mold 127 is contacted to the drum frame 113 and then the electroconductive resin 134 is injected to mold the charging contact portion 119b. As shown in (a) of FIG. 22, by the contact of the mold 127 to t drum frame 113, by a projection 127b provided on the mold 127 and the drum frame 113, a space 120b is formed. Then, as shown in (b) of FIG. 22, the electroconductive resin 134 passes through the tunnel-shaped resin flow passage 113c, so that the electroconductive resin 134 flows into the space 120b. Then, as shown in (c) of FIG. 22, the injection of the electroconductive resin 134 into the space 120b is completed, so that the charging contact portion 119b is formed.

Figure 23:
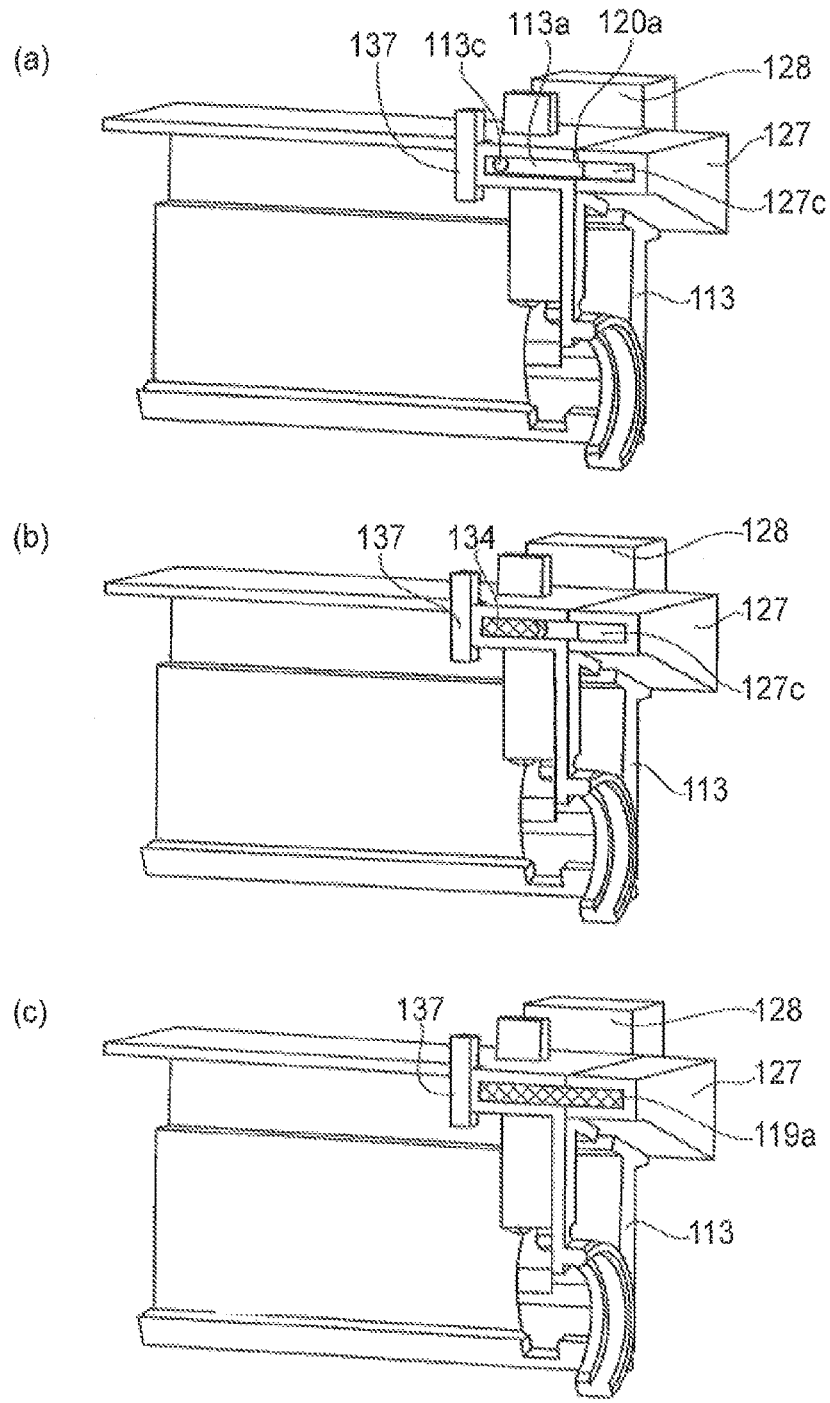
FIG. 23 includes sectional perspective views showing a state in which the electroconductive resin is injected when an exposed contact portion is formed.

FIG. 23 includes sectional views when the mold 127 is contacted to the drum frame 113 and then the electroconductive resin 134 is injected to mold the exposed contact portion 119a. As shown in (a) of FIG. 23, by the contact of the mold 127 to t drum frame 113, the flow passage 113a of the drum frame 113 and the recess 127c of the mold 127 are in a connected state. Then, in (b) of FIG. 23, the electroconductive resin 134 passes through the tunnel-shaped resin flow passage 113c and further flows into the flow passage 113a. Then, in (c) of FIG. 23, the injection of the electroconductive resin 134 into the recess 127c is completed, whereby the exposed contact portion 119a is formed.

That is, the mold 127 for molding the electrode portion 119 includes a surface 127a to be abutted against the surface 113e of the drum frame 113e, the recess 127c for molding the exposed contact portion 119a, and the projection 127b for molding the charging contact portion 119b.

Figure 13:
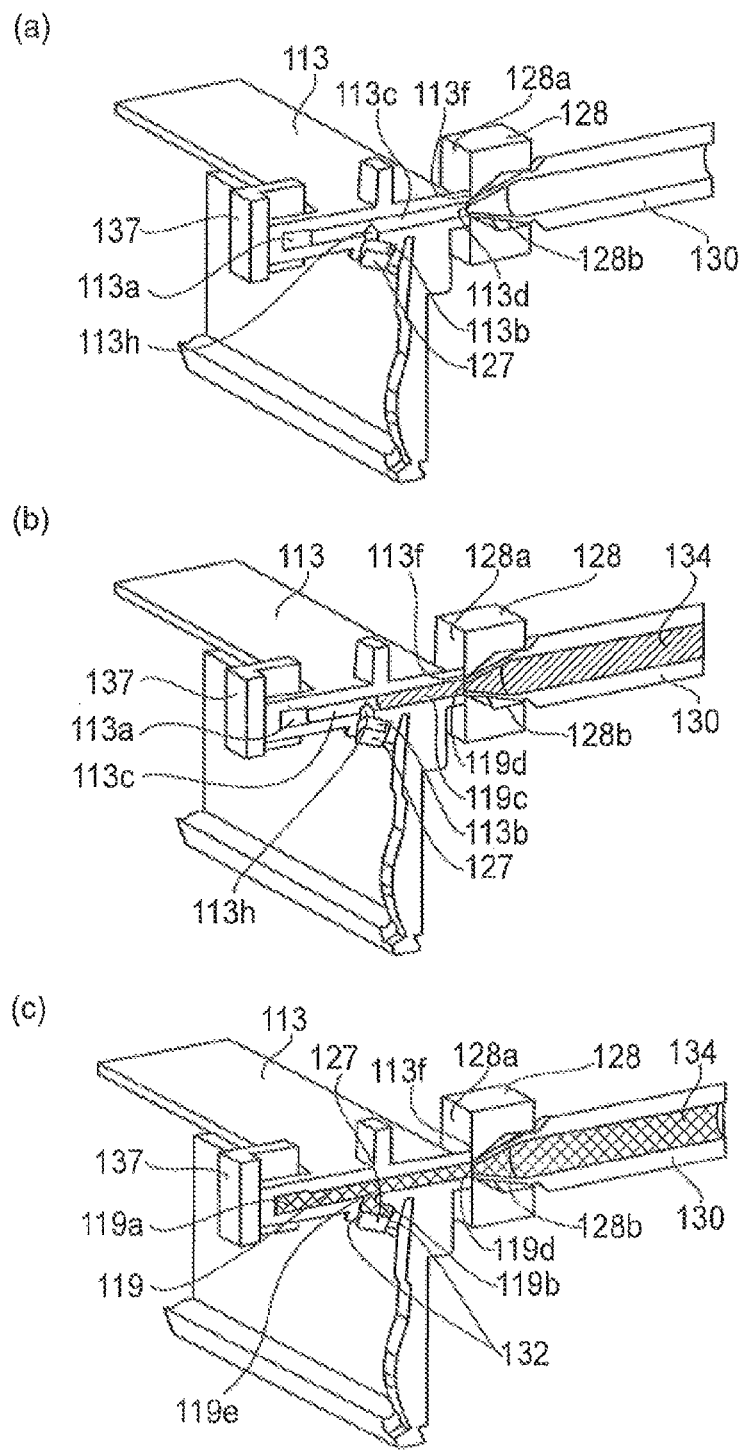
FIG. 13 includes sectional views, of a drum frame and a mold, for illustrating a step of injecting an electroconductive resin for forming an electrode portion according to Embodiment 3.
Figure 19:
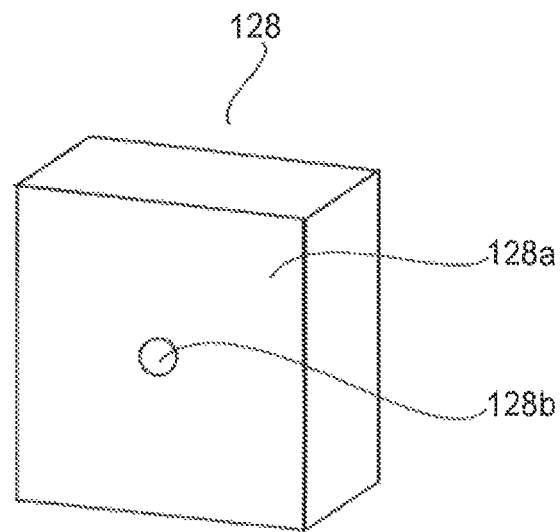
FIG. 19 is an illustration of a mold used when the electroconductive resin is injected.

Further, by using the FIG. 13, FIG. 16 and FIG. 19, the mold 128 for permitting the injection of the electroconductive resin when the electrode portion is molded. FIG. 13 includes perspective sectional views showing from the contact of the mold 128 to the drum frame 113 until the injection of the electroconductive resin is completed in a time-series manner. Further, FIG. 19 is a view showing only the mold 128. The mold 128 has a surface 128a to be abutted against the drum frame 113 and an injection port 128b into which a nozzle 130 for permitting the injection of the electroconductive resin 134 is to be inserted.

[Electrode Portion Forming Method]

Figure 20:
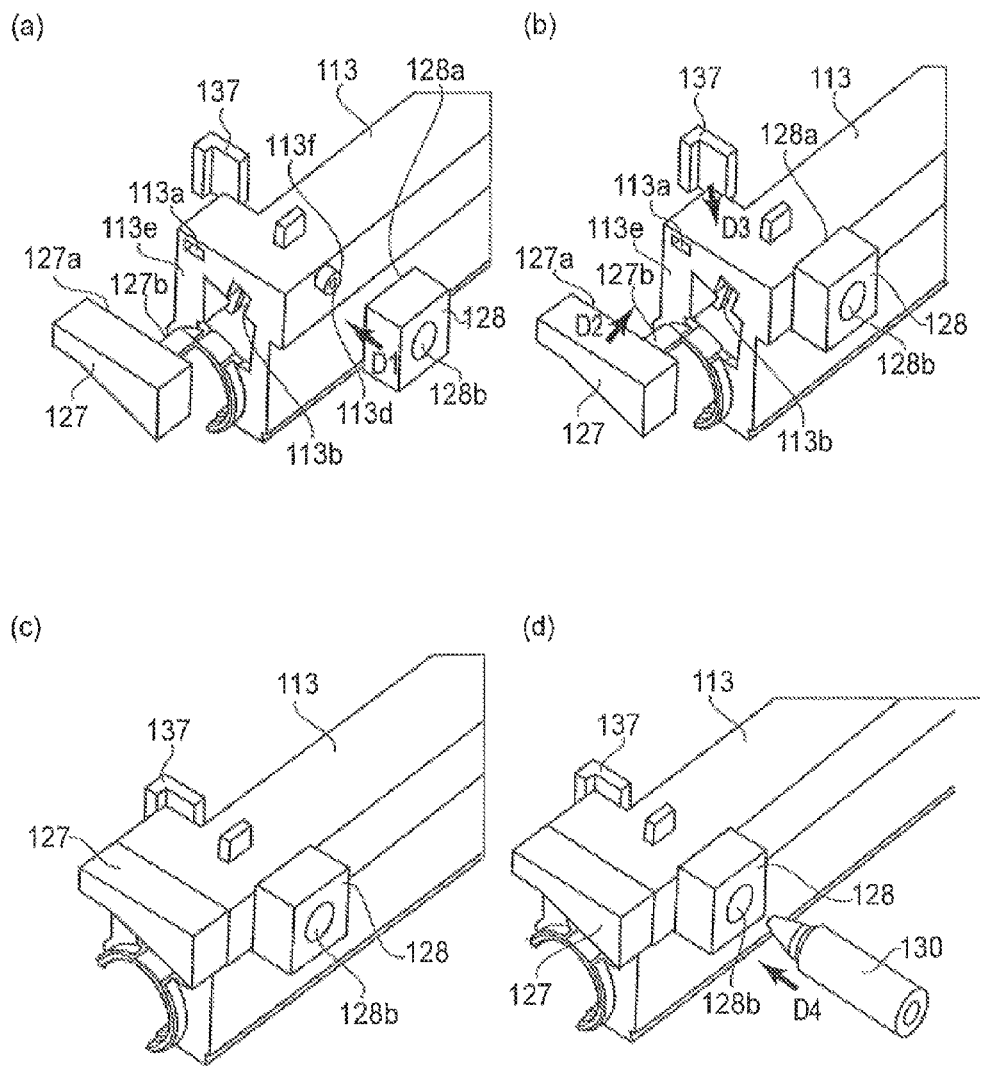
FIG. 20 includes illustrations when the mold is contacted to the drum frame.
Figure 21:
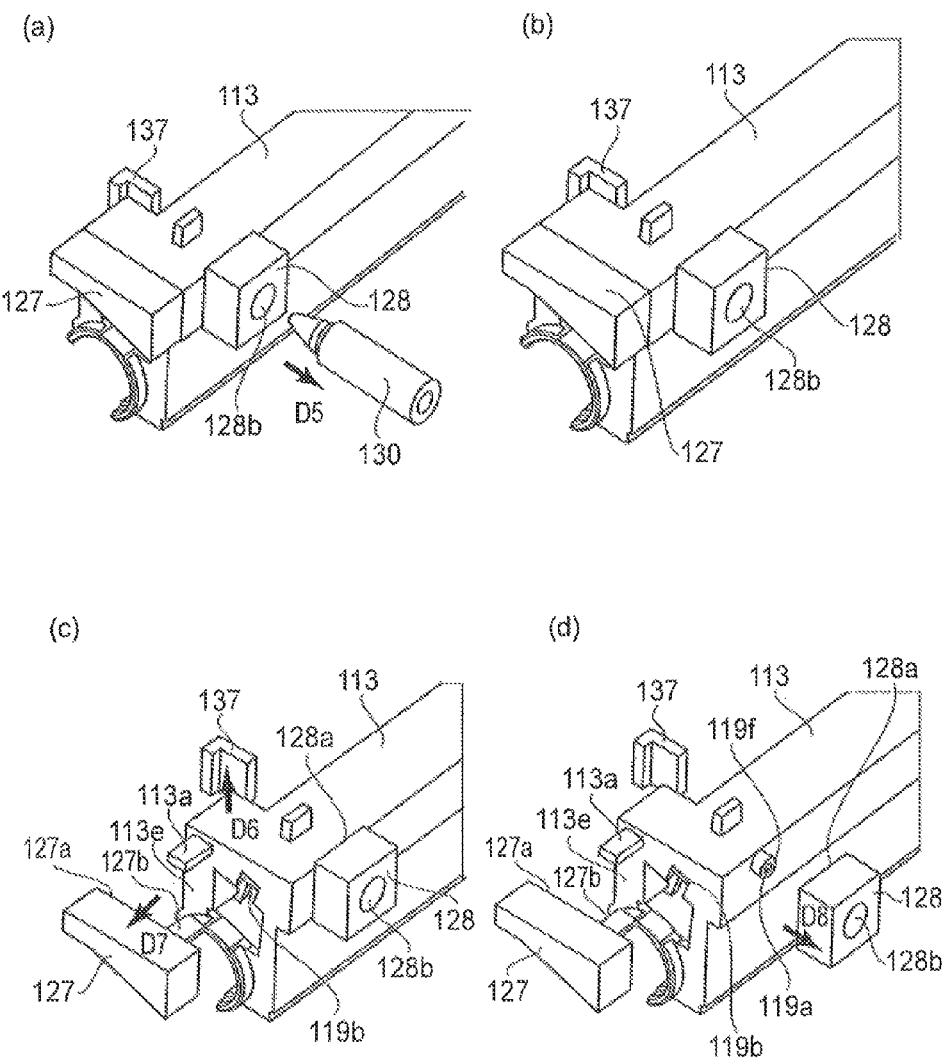
FIG. 21 includes illustrations when the mold is separated from the drum frame.

By using FIG. 13, FIG. 16 to FIG. 23, FIG. 26 and FIG. 28, the molding method of the exposed contact portion 119a and the charging contact portion 119b will be described. FIG. 20 includes perspective views showing steps of bringing the molds 127 and 128 into contact to the drum frame 113 on a time-series basis. FIG. 21 includes perspective views showing steps of separating the molds contacted to the drum frame 113 on a time-series basis.

The electrode portion 119 is integrally molded with the drum frame 113 by injecting the electroconductive resin into a space formed between the drum frame 113 and the mold 127. First of all, as shown in (a) of FIG. 20, the mold 128 is contacted to the drum frame 113 from an arrow D1 direction. At this time, a mold contact surface 113f of the drum frame 113 and the surface 128a of the mold 128 abut against each other.

Next, as shown in (b) of FIG. 20, the mold 127 is contacted to the drum frame 113 from an arrow D2 direction. At this time, a mold contact surface 113e of the drum frame 113 and the surface 27a of the mold 127 abut against each other. Further, a back-up mold 137 abuts against the drum frame 113 from an arrow D3 direction. That is, the mold 137 abuts against the surface opposite from the surfaces where the molds 127 and 128 are contacted to the drum frame 113, thus preventing the drum frame 113 from being deformed by the contact of the molds 127 and 128 to the drum frame 113. Details relating to the back-up will be described later.

Further, a state in which the contact of the three molds 127, 128 and 137 is completed is as shown in (c) of FIG. 20. At this time, as shown in (a) and (d) of FIG. 17 and (a) of FIG. 22, the projection 127b of the mold 127 is inserted into the recess 113b to form the space 120b. Further, as shown in FIG. 18 and (a) of FIG. 23, when the mold 127 is contacted to the drum frame 113, a space obtained by adding the recess 127c of the mold 127 and the flow passage 113a of the drum frame 113 is formed.

Then, as shown in (a) of FIG. 13 and (d) of FIG. 20, the nozzle 130 through which the electroconductive resin 134 is to be injected is inserted from an arrow D4 direction into the injection port 128b of the mold 128 to abut against a rear end portion of the injection port 28b. At this time, the nozzle 130 and the mold 128 may also be integrally constituted originally. Further, a constitution in which the mold 128 is not used and the nozzle 130 is directly inserted into the injection port 113d of the drum frame 130 and then the electroconductive resin 134 is injected may also be employed. Or, a constitution in which the surface 130a is provided at a periphery of the end of the nozzle 130 and after the surface 130a is abutted against the drum frame 113, the electroconductive resin 134 is injected may also be employed. Then, as shown in (b) of FIG. 13, the electroconductive resin 134 is injected into the resin flow passage 113c of the drum frame 113 via the injection port 128b. Next, the electroconductive resin 134 goes along the resin flow passage 113c to reach the branch portion 113h. A part of the electroconductive resin 134 having reached the branch portion 113h flows into the space 120b, and a remaining part of the resin goes along the resin flow passage 113c and gradually fills the flow passage 113a and the recess 127c. Part (c) of FIG. 13, (c) of FIG. 22 and (c) of FIG. 23 are views showing states in which the injection of the electroconductive resin 134 into the space 120b and the spaces with the flow passage 113a and the recess 127c is completed.

Figure 28:
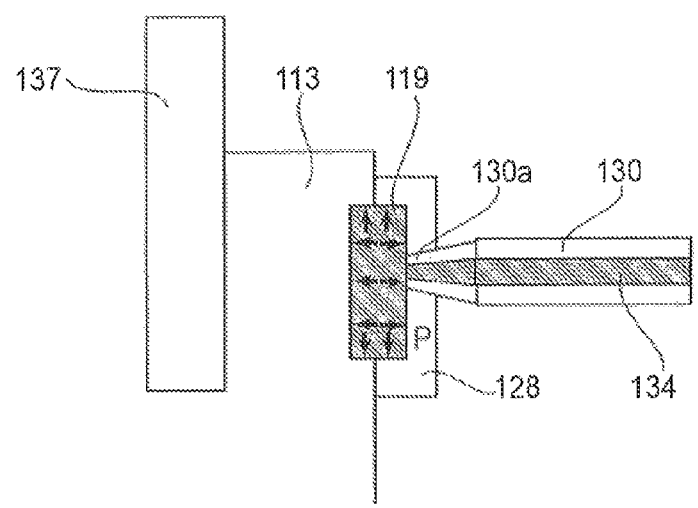
FIG. 28 is a schematic view for illustrating a manner of pressure application during electroconductive resin injection.

Further, as described above, the back-up mold 137 was contacted to the surface opposite from the surfaces where the molds 127 and 128 were contacted to the drum frame 113. This prevents the deformation of the drum frame 113 due to the contact of the molds 127 and 128 to the drum frame 113. In addition, this is also because the drum frame 13 is prevented from being moved and deformed by the resin pressure P during the resin injection as shown in FIG. 28.

Next, description relating to parting will be made. FIG. 21 includes views showing steps of parting the molds, after the resin injection is completed, on a time-series basis. First of all, as shown in (a) of FIG. 21, the nozzle 130 is moved from the injection port 128b of the mold 128 in an arrow D5 direction to be retracted. Next, as shown in (c) of FIG. 21, the mold 127 and the back-up 137 are moved from the drum frame 113 in arrow D6 and D7 directions. Finally, as shown in (d) of FIG. 21, the mold 128 is moved from the drum frame 113 in an arrow D8 direction, so that the electrode portion 119 (the exposed contact portion 119a, the charging contact portion 119b) is in a state in which it is integrally formed with the drum frame 113.

Further, as shown in (b) of FIG. 26, at the charging contact portion 119b, an extruded portion 119b2 where an excessive electroconductive resin is extruded from a periphery of the charging contact portion 119b due to a variation in injection amount is formed. Although the details will be described later, this extruded portion 119b2 is formed in order to mold the shape of the charging contact portion 119b with reliability.

Further, as shown in FIG. 17, the resin flow passage 113c from the injection port 113d to the spring recess 113b and from the injection port 113d to the flow passage 113a is surrounded by the drum frame 113. For that reason, in the case where the electrode portion other than the electrode portion 119 is provided to the drum frame 113, it is possible to alleviate a possibility of an occurrence of a problem such as short circuit by electric discharge caused by proximity of the respective electrode portions. This short circuit by the electric discharge is liable to occur in a creepage distance (for insulation) or spatial distance of not more than a predetermined value. Here, the creepage distance refers to a distance from a molded electrode to another electrode along a wall of the frame (minimum distance) in the case where there are a plurality of contact portions. Further, the spatial distance refers to a spatially linear distance (minimum distance) from the molded electrode to another electrode. Unless this distance is sufficiently ensured, a voltage applied to the electrode in one side is applied to the other electrode, so that there is a possibility that a voltage value is changed.

[Function of Each Shape of Electrode Portion and Tendency of Resistance Value]

Figure 24:
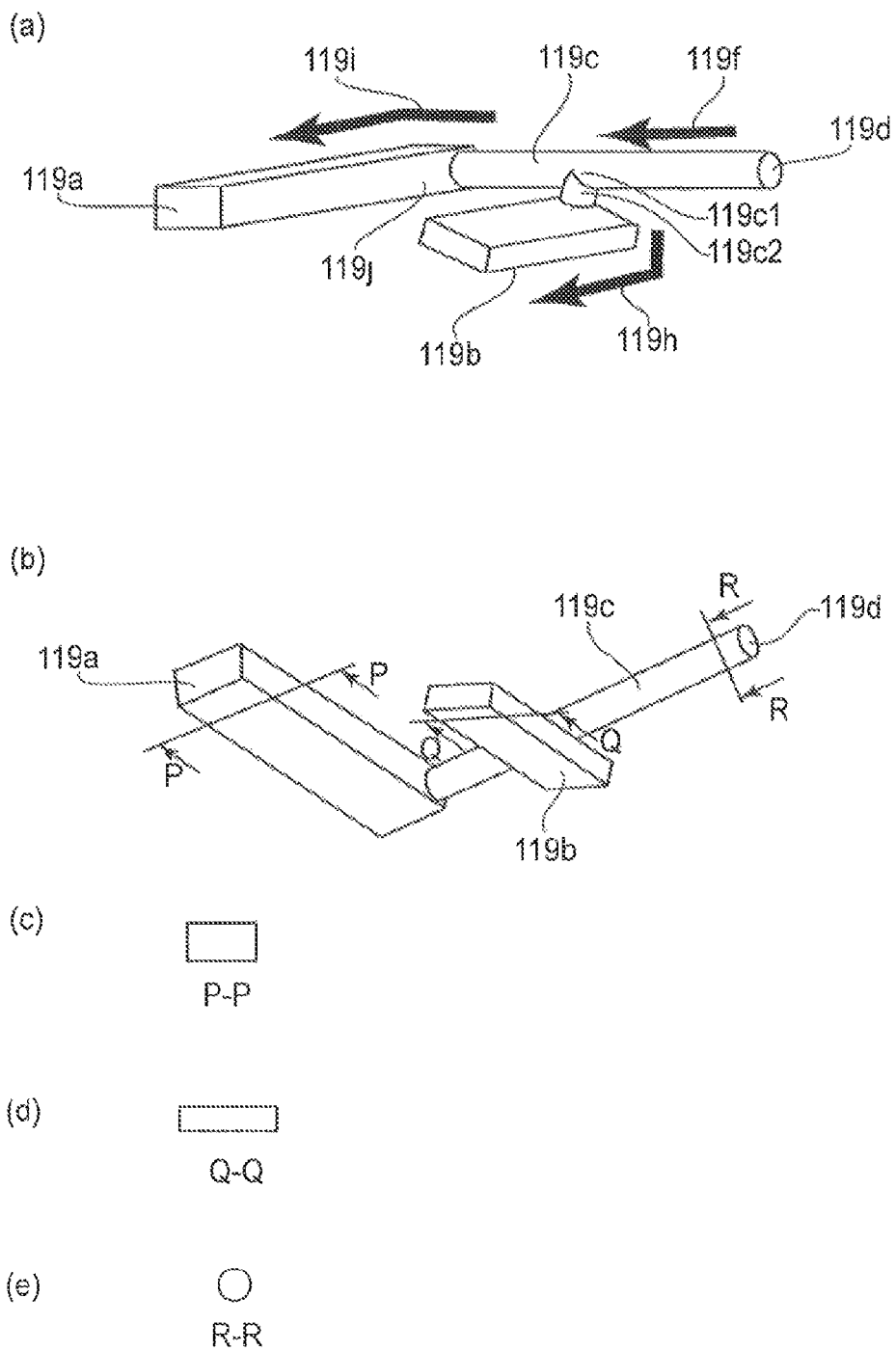
FIG. 24 includes general arrangements, of the electrode portion, for illustrating shape and cross section of the contact portions.
Figure 27:
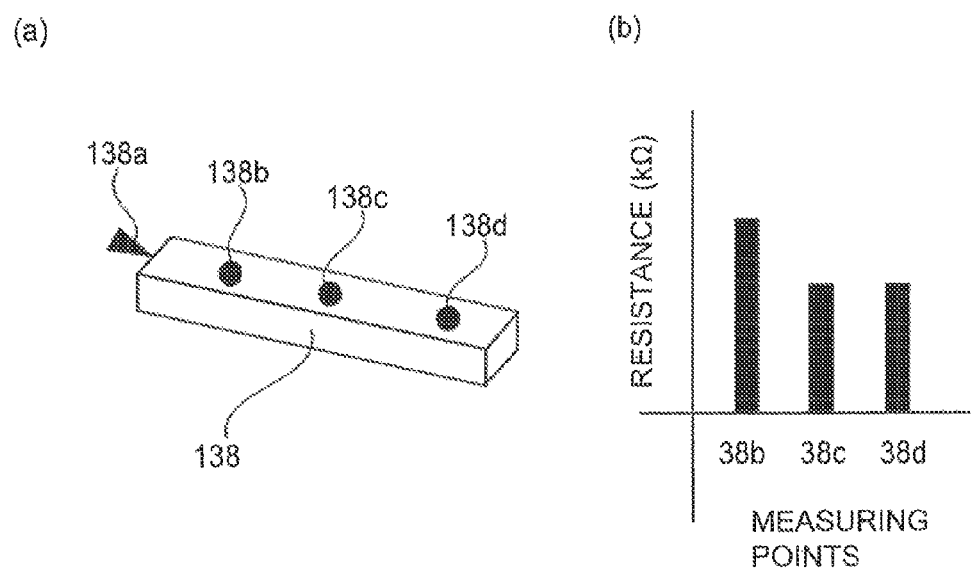
FIG. 27 includes a view and a graph which show a relationship of a resistance value with respect to a distance from a gate position.

Next, by using FIG. 24, FIG. 25 and FIG. 27, the shapes of the molded electrode portion 119 will be described. FIG. 24 includes views for illustrating respective functions as the electrode portion 119 for which the molding is ended. The drum frame 113 is not shown in order to facilitate easy understanding of the shapes of the electrode portion 119. FIG. 25 includes views when the main assembly electrode 121, the compression spring 122a and the charging bearing 123a are shown. FIG. 27 includes views showing a simple model for illustrating a correlation between an electric resistance value and a distance from the gate. As shown in (a) and (b) of FIG. 24, the electrode portion 119 includes the exposed contact portion 119a and the charging contact portion 119b. As shown in (a) of FIG. 25 and (b) of FIG. 5, when the process cartridge B2 is mounted in the apparatus main assembly 100 of the image forming apparatus A, the main assembly electrode 21 contacts the exposed contact portion 119a. Further, when the charging roller 118 is assembled, a charging roller core metal 118a is contacted to the charging bearing 123a consisting of the electroconductive resin, so that the charging roller 118 is rotatably supported. Further, an electroconductive path from the main assembly electrode 121 to the charging roller core metal 118a is ensured via the compression spring 122a contacting the charging bearing 123, the charging contact portion 119b contacting the compression spring 122a, the connecting portion 119c and the exposed contact portion 119a.

Next, as shown in (a), (d) and (e) of FIG. 17 and FIG. 24, the electrode portion 119 is different in cross-section of the exposed contact portion 119a and the charging contact portion 119b compared with the connecting portion 119c.

Here, the cross-sectional shape refers to, when (b) of FIG. 24 is taken as an example, as shown in the figure, cross-sections when the electrode portion 119 is cut along cut lines P-P, Q-Q and R-R.

Specifically, as shown in (c), (d) and (e) of FIG. 24, the cross-section cut along P-P is (c) of FIG. 24, the cross-section cut along Q-Q is (d) of FIG. 24, and the cross-section cut along R-R is (e) of FIG. 24, and the cross-sectional shapes cut along the respective cut lines are mutually different shapes. Further, a resin flowing direction 119f of the resin passing from the gate portion 119d through the connecting portion 119c and flowing-out directions 119h and 119i from the connecting portion 119c when the exposed contact portion 119a and the charging contact portion 119b are molded are different. By this fact, a distribution status of an electroconductive material (electroconductive filler) added to the electroconductive resin 134 is different among the connecting portion 119c, the exposed contact portion 119a and the charging contact portion 119b. That is, the electroconductive material is in a state in which it is not oriented in a certain one direction but is oriented in a direction crossing the one direction.

Generally, it is confirmed that when a plate-like mold, with no bending portion, extending in the resin injection direction and a mold having a shape extending in the resin injection direction and then provided with a bending portion with respect to the injection direction are compared, the latter has a low resistance value during the electric conduction. This is because the electroconductive proper is improved by presence or the like of the bending portion with respect to the resin injection direction and a random distribution of the electroconductive material (carbon black although described later) in the resin.

In this embodiment, as shown in (a) of FIG. 24, the distribution of the electroconductive material in the resin is made random by providing the bending portion with respect to the resin injection direction 119f and by changing the cross-sectional shape of the flow passage. That is, the electroconductive injected from the electrode portion 119d in the arrow 119f direction is divided into two portions at the branch point 119c. One is bent two times as indicated by the arrow 119h to form the charging contact portion 119b. The other is bent two times as indicated by the arrow 119i to form the exposed contact portion 119a. Further, as shown in (b) to (e) of FIG. 24, the cross-sectional shape of the connecting portion 119c is a round shape. On the other hand, the cross-sections of the charging contact portion 119b and the exposed contact portion 119a re a rectangle and is larger in cross-sectional area than that of the cross-section of the connecting portion 119c. By doing so, as described above, the distribution of the electroconductive material in the resin is made random to improve the electroconductive property between the charging contact portion 119b and the exposed contact portion 119a.

Further, also by employing a constitution in which the charging contact portion 119b and the exposed contact portion 119a are provided at positions remote from the gate portion 119d, there is an effect of improving the electroconductive property. Generally, there is a tendency that the electroconductive material in the resin is concentrated at a position (a central portion of the cross-sectional shape) where cooling of the resin is slow and is decreased at the surface portion in a cooling stage from the injection of the electroconductive into the space where the electroconductive resin is constituted with the mold until a mold product is completed. For that reason, e.g., in the shape such that the same cross-sectional shape extends in the resin injection direction, the electroconductive material sinks into the cross-sectional central portion at any position of a longitudinal direction, so that the electroconductive material is decreased at the surface and therefore the resistance value tends to become high. Further, the neighborhood of the gate portion 119d is a region through which the electroconductive resin always passes and therefore cooling of the electroconductive resin in the region is slow, so that the tendency that the electroconductive material is concentrated at the cross-sectional central portion. Therefore, the charging contact portion 119a and the exposed contact portion 119b are disposed in a downstream side of the flow passage when the gate portion 119d of the resin is located upstream of the resin flow passage. This will be described by using a model 38 in (a) of FIG. 27. This model 38 is formed of the same material as the electroconductive resin 34 described in other figures. In this model, a gate is set at 38a and a measuring point is set at three positions with a distance. As shown in (b) of FIG. 27, when an electric resistance value is measured at the positions of the measuring points 138b, 138c and 138d from the gate position 38a, compared with the point 138b, the electric resistance values at the points 138c and 138d are low. Thus, the electric resistance value is more lowered when a certain distance is kept from the gate portion 119d.

As described above, the electroconductive property can be improved by providing the bending portion to the electrode portion 119 or by changing the flow passage cross-sectional shape and thereby to change the distribution state of the electroconductive material. Further, also by employing the constitution in which the charging contact portion 119b and the exposed contact portion 119a are provided at positions remote from the gate portion 119d and the resin injected from the gate portion 119d is branched from the intermediate portion to provide the both contact portions 119a and 119b, the effect of improving the electroconductive property is achieved.

[Electrode Portion Retaining Constitution]

Next, by using FIG. 15, FIG. 23 and FIG. 24, a retaining constitution of the electrode portion 119 with respect to the drum frame 113 will be described.

The electrode portion 119 is formed by injecting the electroconductive resin into the flow passage 113c which is the tunnel-shaped hole provided in the drum frame 113 as described above. As shown in FIG. 24, the electrode portion 119 has the bending portions as indicated by the arrows 119i and 119h at the inside of the drum frame 113. Therefore, the electrode portion 119 is not moved in the longitudinal direction (the N direction shown in FIG. 15) of the drum frame 113 and in the direction perpendicular to the N direction with respect to the drum frame 113. Further, the electrode portion 119 is regulated by a base 119j of 119a shown in (a) of FIG. 24 and a peripheral surface of the flow passage 113a shown in FIG. 23. By that, the electrode portion 119 is prevented from moving in a widthwise direction (the 119f direction shown in FIG. 24 or its opposite direction) or rotating with the first connecting portion 119c as an axis (shaft). By employing such a constitution, even when impact is applied to the process cartridge B during transportation or the like, such a problem that the electrode portion 119 is dropped from the drum frame 113 or floated from the drum frame 113 does not occur. Further, in the case where a plurality of contact portions are needed, a resin creeping path can be formed in a branching manner, so that formation of complicated contact portions is enabled and it is possible to enhance a design latitude of the electroconductive path. Further, in the case where the gate portion 119d is provided in an upstream side of the injection direction, the electroconductive property of the electrode portion 119 is improved by providing the contact portions 119a and 119b in the flow passage downstream side. Further, in the conventional embodiment, there was needs to provide the injection port for mounting the electrode portion to the frame and the hole, cut-away portion and the like for positioning and therefore it was feared that strength of the cartridge frame was lowered. On the other hand, according to the present invention, the electroconductive resin is injected into the hole or the like in the drum frame 113 and therefore such a hole can be filled with the resin, so that it is possible to suppress the lowering in strength of the drum frame.

Further, in the case where the conventional metal plate contact is used, a mounting portion for permitting mounting of the metal plate contact to the frame was required. On the other hand, when the constitution of this embodiment is used, when an anchor shape is provided as a part of the shape into which the electroconductive resin is to be injected, a retaining function can be performed without providing the retaining portion and therefore it is possible to reduce an excessive space in which the retaining portion is provided.

Further, on the other hand, in this embodiment, the molding is made by flowing the electroconductive resin into the frame directly and therefore compared with the case where the electrode member as a separate member is assembled with the frame, operativity is improved.

Further, when the metal plate contact is assembled, component tolerance or assembling tolerance of the respective parts are generated and therefore positional accuracy of the metal plate contact with respect to the frame is decreased. On the other hand, in this embodiment, the electroconductive resin is caused to directly flow into the frame to effect the molding, so that the positional accuracy with respect to the frame is improved.

[Buffer Portion]

Figure 29:
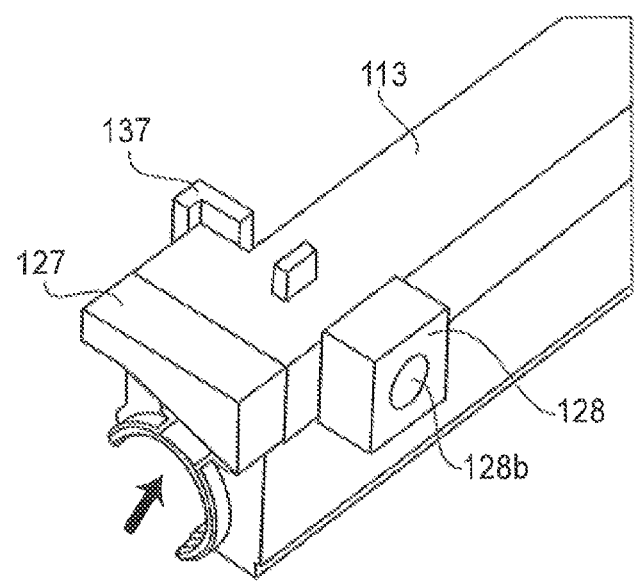
FIG. 29 includes illustrations of a buffer portion of the charging contact portion.
Figure 29:
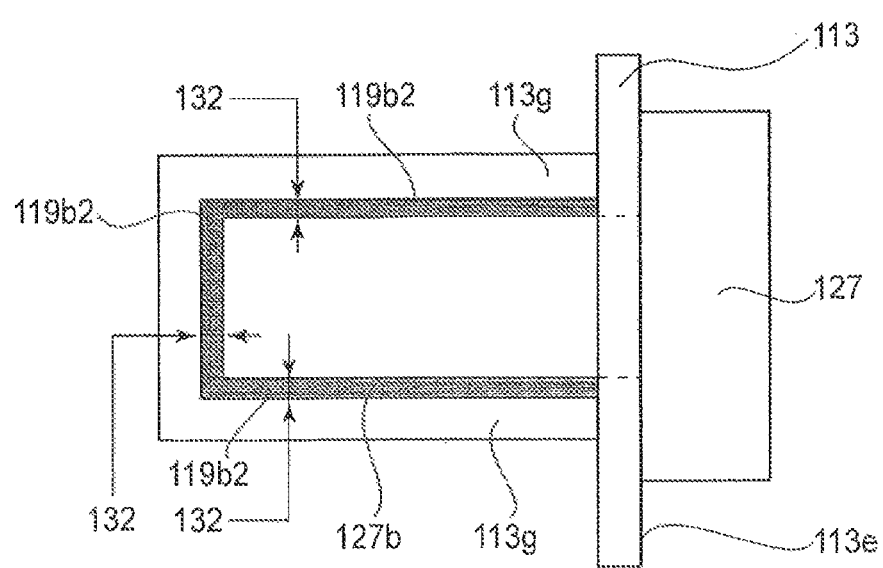

Next, by using FIG. 13, FIG. 14 and FIG. 29, the buffer portion 132 will be described. FIG. 29 includes illustrations showing a position of the buffer portion 132. Part (a) of FIG. 29 is a perspective view showing a state in which the mold 127 is contacted to the drum frame 113. Part (b) of FIG. 29 is a schematic view of a state in which the drum frame 113 and the mold 127 contact as seen in an arrow direction (direction perpendicular to a contact surface of the charging contact portion 119b to the compression spring 122a) shown in (a) of FIG. 29.

As shown in FIG. 13 and (b) of FIG. 29, in the drum frame 113, in the neighborhood of the charging contact portion 119d, the buffer portion 132 is provided. As shown in FIG. 13 and (b) of FIG. 29, specifically, a spacing among the mold injection port 113g, the spring bearing surface forming portion 113b of the drum frame 113, and the projection 127b when the projection 127b of the mold 127 is injected when the charging contact portion 119b is molded becomes the buffer portion 132. When the electrode portion 119 is molded, by increasing the resin injection amount with respect to the injection space, the extruded portion 119b2 of the excessive electroconductive resin from the periphery of the exposed contact portion 119a is formed as described above. This extruded portion 119b2 is formed in order to mold the shapes of the exposed contact portion 119a and the charging contact portion 119b with reliability. This buffer portion 132 is the space for permitting the formation of this extruded portion 119b2.

Further, the buffer portion 132 is provided inside the drum frame 113. For that reason, the extruded mold 119b2 is prevented from being touched by a user from the outside of the process cartridge B and therefore is not folded and dropped by the touch by the user.

Incidentally, in this embodiment, the buffer portion 132 was provided in the neighborhood of the charging contact portion 119d. However, the buffer portion 132 is not limited thereto but may also be provided at an intermediary portion of the resin injection path.

[Position Regulating Constitution of Charging Roller Compression Spring]

Next, by using FIG. 30 and FIG. 31, a position regulating constitution of the compression spring for urging the charging roller 118 against the photosensitive drum 107 will be described.

Figure 30:
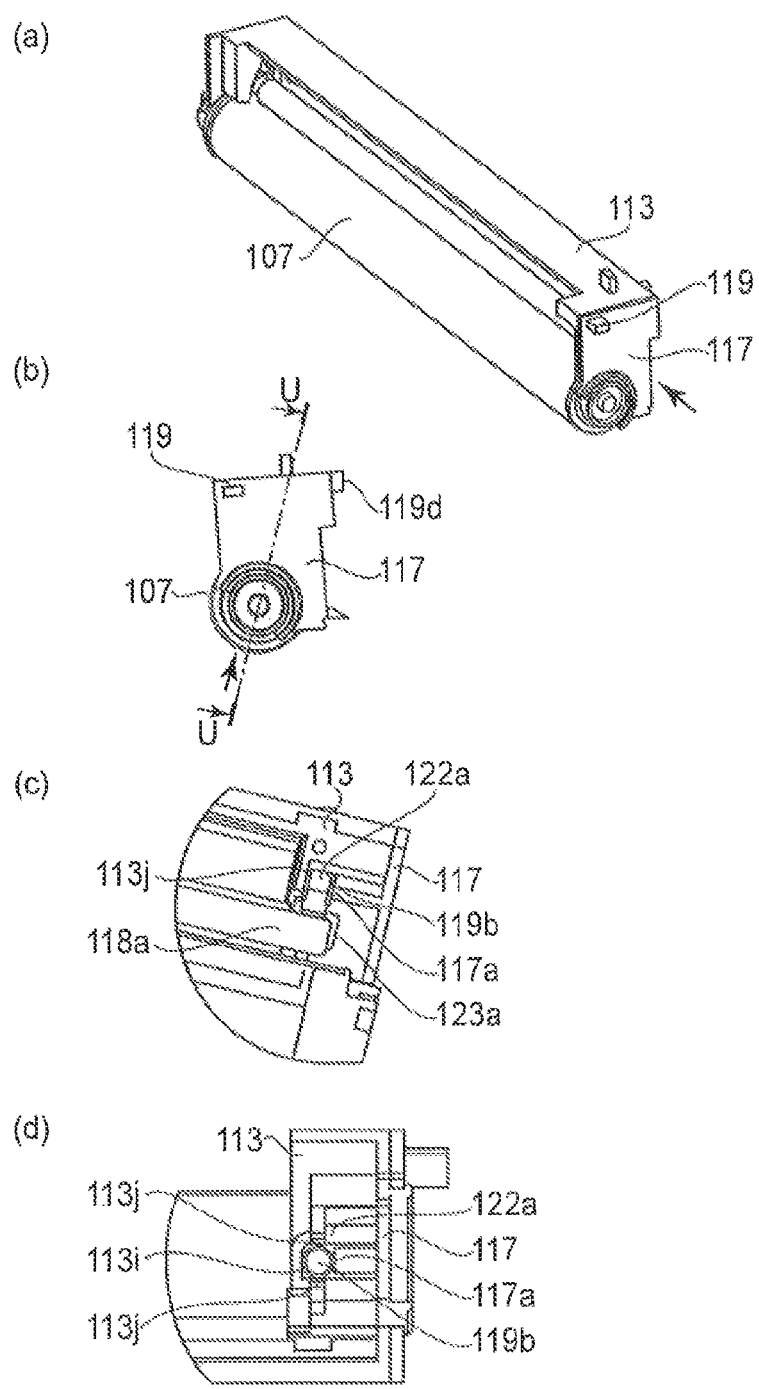
FIG. 30 includes views showing a structure for effecting positioning of a charging contact spring.
Figure 31:
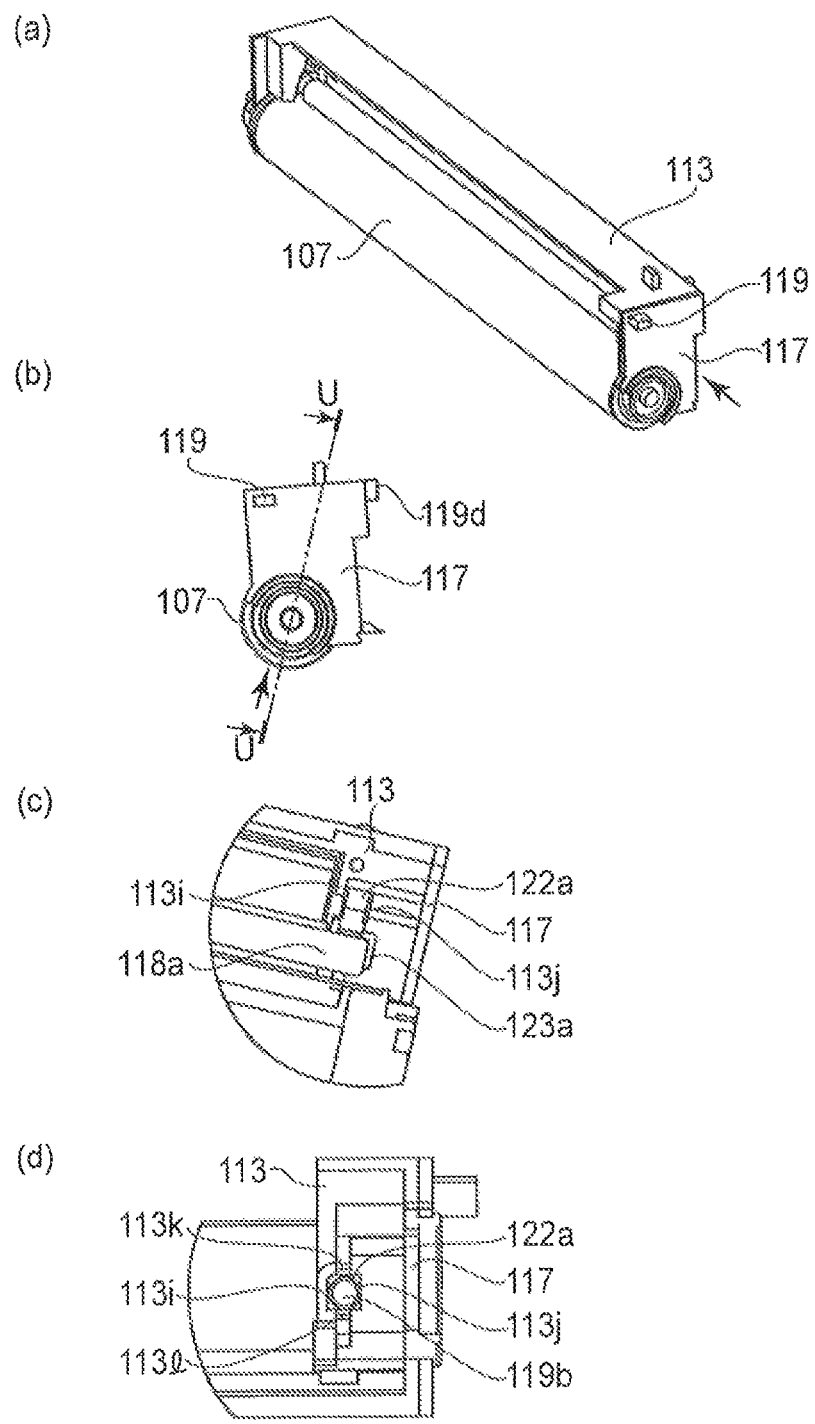
FIG. 31 includes views showing a structure for effecting positioning of the charging contact spring.

FIG. 30 and FIG. 31 are views showing a frame constitution for regulating the position of the compression spring 112a. Part (a) of FIG. 30 is a perspective view of an outer appearance of the drum frame 113 when a cover member 117 is mounted on the drum frame 113 at one longitudinal end side. Part (b) of FIG. 30 is an outer appearance view when the drum frame 113 is viewed from an arrow direction shown in (b) of FIG. 30. Part (c) of FIG. 30 is a sectional view when the drum frame 113 is cut along U-U line shown in (b) of FIG. 30. Part (d) of FIG. 30 is a view when the drum frame 113 is viewed from an arrow direction shown in (b) of FIG. 30. In the figure of (d) of FIG. 30, the photosensitive drum 107, the charging roller 118 and the charging bearing 123a are not shown.

The compression spring 122a contacts the charging contact portion 119b but the charging contact portion 119b has a flat surface shape and therefore the compression spring 122a cannot be directly positioned with respect to the charging contact portion 118b. The reason why the charging contact portion 119b has the flat surface shape is that the charging contact portion 119b is prevented from constituting an undercut when the mold 127 is separated from the drum frame 113. Therefore, in order to position the compression spring 122a with respect to the drum frame 113, the drum frame 113 is provided with regulating surfaces 113i and 113j. By these, an outer periphery of the compression spring 122a is regulated while leaving one direction. The remaining one direction is regulated by a cover regulation portion 117a provided to the cover member 117 to be mounted on the drum frame 113 after the compression spring 122a is mounted to the drum frame 113. By doing so, the compression spring 122a is positioned with respect to the drum frame 113.

Next, another constitution different from the constitution of FIG. 30 will be described by using FIG. 31. Part (a) of FIG. 31 is a perspective view of an outer appearance of the drum frame 113 when a cover member 117 is mounted on the drum frame 113 at one longitudinal end side. Part (b) of FIG. 31 is an outer appearance view when the drum frame 113 is viewed from an arrow direction shown in (b) of FIG. 31. Part (c) of FIG. 31 is a sectional view when the drum frame 113 is cut along U-U line shown in (b) of FIG. 31. Part (d) of FIG. 31 is a view when the drum frame 113 is viewed from an arrow direction shown in (b) of FIG. 31. In the figure of (d) of FIG. 31, the photosensitive drum 107, the charging roller 118 and the charging bearing 123a are not shown.

The drum frame 113 is provided with the regulating surfaces 113i and 113j in order to position the compression spring 122a. The regulating surfaces 113i, 113k, 113l and 113j regulate the outer diameter portion of the compression spring 122a with respect to a height direction. The reason why the outer peripheral portion of the compression spring 122a is regulated at different heights is that there is a need to provide the drum frame 113 with the mold injection port 113g, into which the projection 127b of the mold 127 is to be injected, in view of the shaping with the mold during the molding of the drum frame 113. By employing such a constitution, the positioning of the compression spring 122a can be realized by the single part, i.e., the drum frame 113.

In both of FIG. 30 and FIG. 31, the regulating surface 113i is a rectilinear line but may also have an arcuate shape similar to the outer diameter portion of the compression spring 122a. Further, the surfaces 113j and 117a may similarly have the arcuate shape.

[Other Embodiments]

Further, the electrode portion in this embodiment electrically connects the charging roller 118 and the main assembly electrode 121 in the drum unit D but the present invention is not limited thereto. The electrode portion may also electrically connect, e.g., the photosensitive drum 107 and the main assembly of image forming apparatus A in the drum unit D. Further, the electrode portion may also be provided correspondingly to each of the photosensitive drum 107 and the charging roller 118. That is, the contact portion for electrically connecting the charging roller 118 and the main assembly of the image forming apparatus A and the contact portion for electrically connecting the photosensitive drum 107 and the main assembly of the image forming apparatus A may also be provided. Further, the charging roller 118 and the contact portion, and the photosensitive drum 107 and the contact portion may also be, respectively similarly as described above, constituted so as to be electrically connected via the compression spring 22 or directly.

Figure 32:
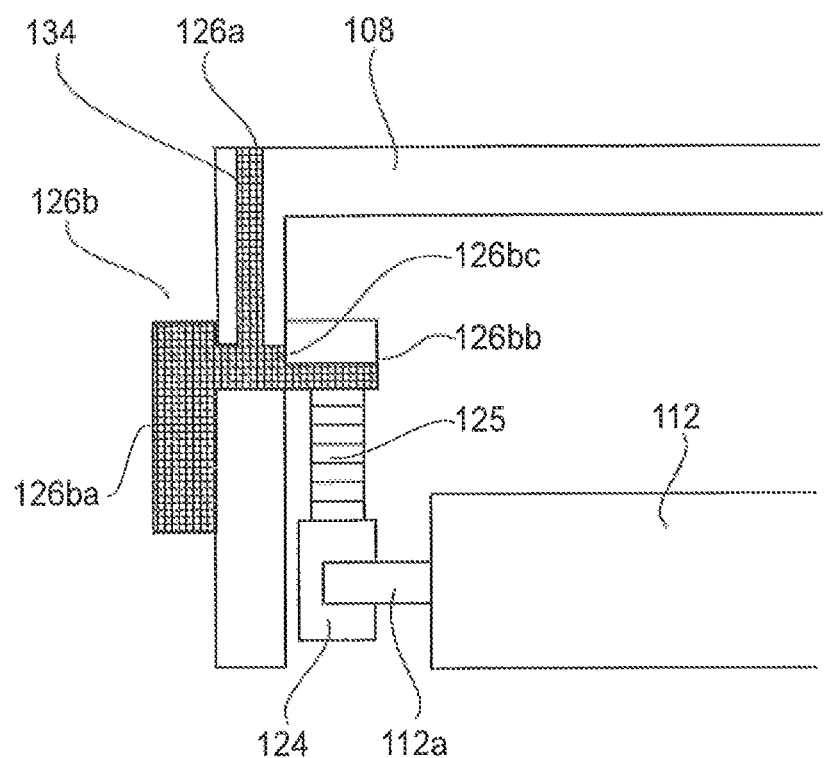
FIG. 32 is a view showing an embodiment when the electrode portion is used in a developing unit.

Further, this embodiment was described by using the drum unit D, but the electrode portion may also be applied to the developing unit C. FIG. 32 is an illustration when an electrode portion 126 is molded with the electroconductive resin 134 with respect to the developing frame 108. As the electrode portion 126, an exposed contact portion 126a for being electrically connected to the main assembly and a developing contact portion 126bb are formed by injecting the electroconductive resin 134 from an inject receiving portion (gate portion) 126a and branching a resin flow passage at a branch portion 126a. The developing contact portion 126bb contacts a developing roller urging member 125. By this, the apparatus main assembly and the developing roller 112 are electrically connected via a developing main assembly contact portion 126a, the developing contact portion 126bb, the developing roller urging member 125, a developing roller supporting portion 124 and a developing roller core metal 112b.

Incidentally, in this embodiment, the developing roller 112 is illustrated but even the toner supplying roller 116 may also be electrically connected to the main assembly by using a similar constitution. Further, in the case where the electrode portion is applied to such a process cartridge B2, the electrode portion may also be provided in a plurality of electrode portions correspondingly to each of the electrophotographic photosensitive drum and the plurality of recording material. In this case, with respect to the plurality of contact portions, there is a need to provide each contact portion with an injection port through which the electroconductive resin 134 is to be injected. However, a constitution in which a single injection port is provided and is branched from an intermediate portion of the flow passage to cause the electroconductive resin 134 to flow into the plurality of contact forming portions to mold each contact portion may also be employed.

In this embodiment, the electrode portion is provided to the developing frame 108 but the contact portion may also be provided to a supporting member for supporting the developing roller 112 and the toner supplying roller 116. Also the electrical connection to the contact portion in the constitution of the electrophotographic photosensitive drum and the plurality of process means may be constituted, similarly as described above, so as to be made via the compression spring 125 or directly.

Further, in this embodiment, polyacetal containing about 10% of carbon black as the electroconductive material is used for the electrode portion 119. In the background of the use of carbon black, damage (abrasion or the like) to a manufacturing apparatus is intended to be minimized but carbon fiber and another metal-based additive or the like may also be used.

As described above, according to this embodiment, compared with the conventional embodiment, when the plurality of the contact portions are needed, the creepage distance or spatial distance can be ensured by the thickness of the tunnel shape and therefore the creeping path of the electrode portion becomes simple.

Further, the electroconductive resin is injected into the frame to prepare the cartridge provided with the electrode portion for electrically connecting the main assembly contact and the process means and therefore it is possible to realize simplification of the constitutions of the frame and the electrode portion and improvements in assembling property of the cartridge and in electroconductive property of the electrode portion.

INDUSTRIAL APPLICABILITY

According to the present invention, by the cartridge provided with the electrode portion formed injecting the electroconductive resin into the frame to electrically connect the main assembly contact and the process means, it is possible to realize the simplification of the constitutions of the frame and the electrode portion and the improvements in assembling property of the cartridge and in electroconductive property of the electrode portion.

The invention claimed is:

1. A manufacturing method of a cartridge detachably mountable to an apparatus main assembly of an image forming apparatus, wherein said cartridge includes:
   (i) process means for effecting image formation,
   (ii) a frame for supporting the process means, and
   (iii) a cartridge electrode including a first contact portion provided for being electrically connected to a main assembly contact of the apparatus main assembly and a second contact portion provided for being electrically connected to the process means,
   wherein said manufacturing method comprises:
   a step of integrally molding the cartridge electrode with the frame in a manner such that a mold is contacted to the frame so as to form a space including a first space for forming the first contact portion, a second space for forming the second contact portion, and a connecting space branching from an injection portion into the first space and the second space and an electroconductive resin is injected from the injection portion into the space.

2. A manufacturing method according to claim 1, wherein the first contact portion and the second contact portion are molded so as to change their directions from a direction in which the electroconductive resin is injected to different directions.

3. A manufacturing method according to claim 1, wherein the electroconductive resin flows through a flow path provided on the frame.

4. A manufacturing method according to claim 3, wherein the flow path is bent.

5. A manufacturing method according to claim 3, wherein the flow path has a first width at a portion from an injected position of the electroconductive resin to a branch portion where the electroconductive resin branches and a second width at a portion from the branch portion to the first contact portion and/or the second contact portion, the second width being larger than the first width.

6. A manufacturing method according to claim 1, wherein the electroconductive resin extrudes from the space to form a buffer portion.

7. A manufacturing method of a cartridge detachably mountable to an apparatus main assembly of an image forming apparatus, wherein said cartridge includes:
   (i) process means for effecting image formation,
   (ii) a frame for supporting the process means,
   (iii) a cartridge electrode including a first contact portion provided for being electrically connected to a main assembly contact of the apparatus main assembly and a second contact portion provided for being electrically connected to the process means, and
   (iv) an electroconductive member for electrically connecting the process means and the cartridge electrode,
   wherein said manufacturing method comprises:
   a step of forming the cartridge electrode in a manner such that a mold is contacted to the frame and an electroconductive resin is injected from an injection portion into a forming space formed between the frame and the mold so as to form a buffer portion with the electroconductive resin passed through the forming space, the buffer portion projecting from an edge portion of the second contact portion.

8. A manufacturing method according to claim 7, wherein the projected portion is formed by extruding from the space between the frame and the mold.

9. A manufacturing method according to claim 7, wherein the electroconductive resin flows through a flow path provided on the frame.

10. A manufacturing method according to claim 9, wherein the flow path is bent.

* * * * *